(12) United States Patent
Starobin et al.

(10) Patent No.: US 11,749,249 B2
(45) Date of Patent: Sep. 5, 2023

(54) SYSTEM AND METHOD FOR INTEGRATING A HOME MEDIA SYSTEM AND OTHER HOME SYSTEMS

(71) Applicant: Sound United, LLC, Vista, CA (US)

(72) Inventors: Bradley M. Starobin, Baltimore, MD (US); Matthew Lyons, York, PA (US); Stuart W. Lumsden, Ruxton, MD (US); Michael DiTullo, Encinitas, CA (US); Paul O'Connor, Portland, OR (US)

(73) Assignee: SOUND UNITED, LLC., Vista, CA (US)

( * ) Notice: Subject to any disclaimer, the term of this patent is extended or adjusted under 35 U.S.C. 154(b) by 135 days.

(21) Appl. No.: 17/496,157

(22) Filed: Oct. 7, 2021

(65) Prior Publication Data
US 2022/0028364 A1 Jan. 27, 2022

Related U.S. Application Data

(63) Continuation of application No. 16/848,490, filed on Apr. 14, 2020, now Pat. No. 11,176,922, which is a continuation of application No. 14/752,505, filed on Jun. 26, 2015, now Pat. No. 10,657,949.

(51) Int. Cl.
| | | |
|---|---|---|
| H04B 3/00 | (2006.01) | |
| G10K 11/178 | (2006.01) | |
| H04R 27/00 | (2006.01) | |
| H04L 12/28 | (2006.01) | |
| G08B 19/00 | (2006.01) | |
| H04L 12/46 | (2006.01) | |
| H04S 7/00 | (2006.01) | |

(52) U.S. Cl.
CPC ........ *G10K 11/17821* (2018.01); *G08B 19/00* (2013.01); *G10K 11/1783* (2018.01); *G10K 11/17817* (2018.01); *G10K 11/17823* (2018.01); *G10K 11/17853* (2018.01); *G10K 11/17857* (2018.01); *G10K 11/17875* (2018.01); *G10K 11/17881* (2018.01); *G10K 11/17885* (2018.01); *H04L 12/2832* (2013.01); *H04L 12/4625* (2013.01); *H04R 27/00* (2013.01); *H04S 7/303* (2013.01); *H04L 2012/2849* (2013.01); *H04R 2227/003* (2013.01); *H04R 2227/005* (2013.01); *H04S 2400/13* (2013.01)

(58) Field of Classification Search
CPC ....... G10K 11/17821; G10K 11/17823; G10K 11/17853; G10K 11/17857
See application file for complete search history.

(56) References Cited

U.S. PATENT DOCUMENTS

| | | | |
|---|---|---|---|
| 7,234,115 B1 * | 6/2007 | Sprauve | H04L 12/66 715/744 |
| 9,449,229 B1 * | 9/2016 | Laska | G08B 13/19606 |
| 9,501,915 B1 * | 11/2016 | Laska | G06V 40/172 |
| 9,875,647 B1 * | 1/2018 | Tannenbaum | G06F 21/42 |

(Continued)

*Primary Examiner* — Simon King
(74) *Attorney, Agent, or Firm* — McAndrews, Held & Malloy, Ltd.

(57) ABSTRACT

A system and method for integrating a home media system and other home systems. As a non-limiting example, various aspects of this disclosure provide a system and method that flexibly and efficiently provide communication and/or resource sharing between a home media system and various other home systems.

20 Claims, 10 Drawing Sheets

(56) References Cited

U.S. PATENT DOCUMENTS

| | | |
|---|---|---|
| 10,657,949 B2 | 5/2020 | Starobin et al. |
| 2003/0023741 A1 | 1/2003 | Fomassetti |
| 2005/0251832 A1 | 11/2005 | Chiueh |
| 2006/0064533 A1 | 3/2006 | Rael |
| 2008/0065235 A1 | 3/2008 | Igoe |
| 2008/0066094 A1 | 3/2008 | Igoe |
| 2011/0211584 A1 | 9/2011 | Mahmoud |
| 2013/0076651 A1 | 3/2013 | Reimann |
| 2013/0173064 A1 | 7/2013 | Fadell |
| 2014/0093085 A1 | 4/2014 | Jarvis |
| 2014/0244013 A1 | 8/2014 | Reilly |
| 2015/0096876 A1 | 4/2015 | Mittleman |
| 2015/0097689 A1 | 4/2015 | Logue |
| 2015/0100618 A1* | 4/2015 | Le Guen ............. H04L 65/1036 |
| | | 709/201 |
| 2015/0264131 A1 | 9/2015 | Goldstein |
| 2016/0132031 A1 | 5/2016 | Kozura |
| 2016/0189513 A1 | 6/2016 | Sloo |
| 2016/0286607 A1* | 9/2016 | Mishra ................ G08B 25/009 |
| 2016/0300468 A1* | 10/2016 | Stricker ................ G08B 21/02 |
| 2016/0343227 A1 | 11/2016 | Shih |
| 2016/0364114 A1* | 12/2016 | Von Dehsen ....... G06F 3/04817 |
| 2016/0364963 A1* | 12/2016 | Matsuoka ............ G06V 10/764 |
| 2016/0365885 A1* | 12/2016 | Honjo .................... H04W 4/80 |
| 2016/0373909 A1 | 12/2016 | Rasmussen |
| 2017/0048280 A1 | 2/2017 | Logue |

* cited by examiner

SYSTEM AND METHOD FOR INTEGRATING A HOME MEDIA SYSTEM AND OTHER HOME SYSTEMS

CROSS-REFERENCE TO RELATED APPLICATIONS/INCORPORATION BY REFERENCE

The present application is a continuation of U.S. application Ser. No. 16/848,490 filed, Apr. 14, 2020, which is a continuation of U.S. application Ser. No. 14/752,505, filed Jun. 26, 2015, (Patent No. 10,657,949), which is related to U.S. application Ser. No. 14/725,904, filed May 29, 2015, titled "Multi-zone Media System and Method for Providing Multi-zone Media;" U.S. application Ser. No. 14/726,019, filed May 29, 2015, titled "System and Method for Providing User Location-based Multi-zone Media;" and U.S. application Ser. No. 14/726,109, filed May 29, 2015, titled "System and Method for Selecting and Providing Zone-Specific Media;" the contents of each of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Present systems and methods for providing communication between the user and various systems of a premises, for example between the user and various home systems, are inadequate. Further limitations and disadvantages of conventional and traditional approaches will become apparent to one of skill in the art, through comparison of such approaches with the present disclosure as set forth in the remainder of the present application with reference to the drawings.

BRIEF DESCRIPTION OF SEVERAL VIEWS OF THE DRAWINGS

The accompanying drawings are included to provide a further understanding of the present disclosure, and are incorporated in and constitute a part of this specification. The drawings illustrate examples of the present disclosure and, together with the description, serve to explain various principles of the present disclosure. In the drawings.

SUMMARY

Figure 1:
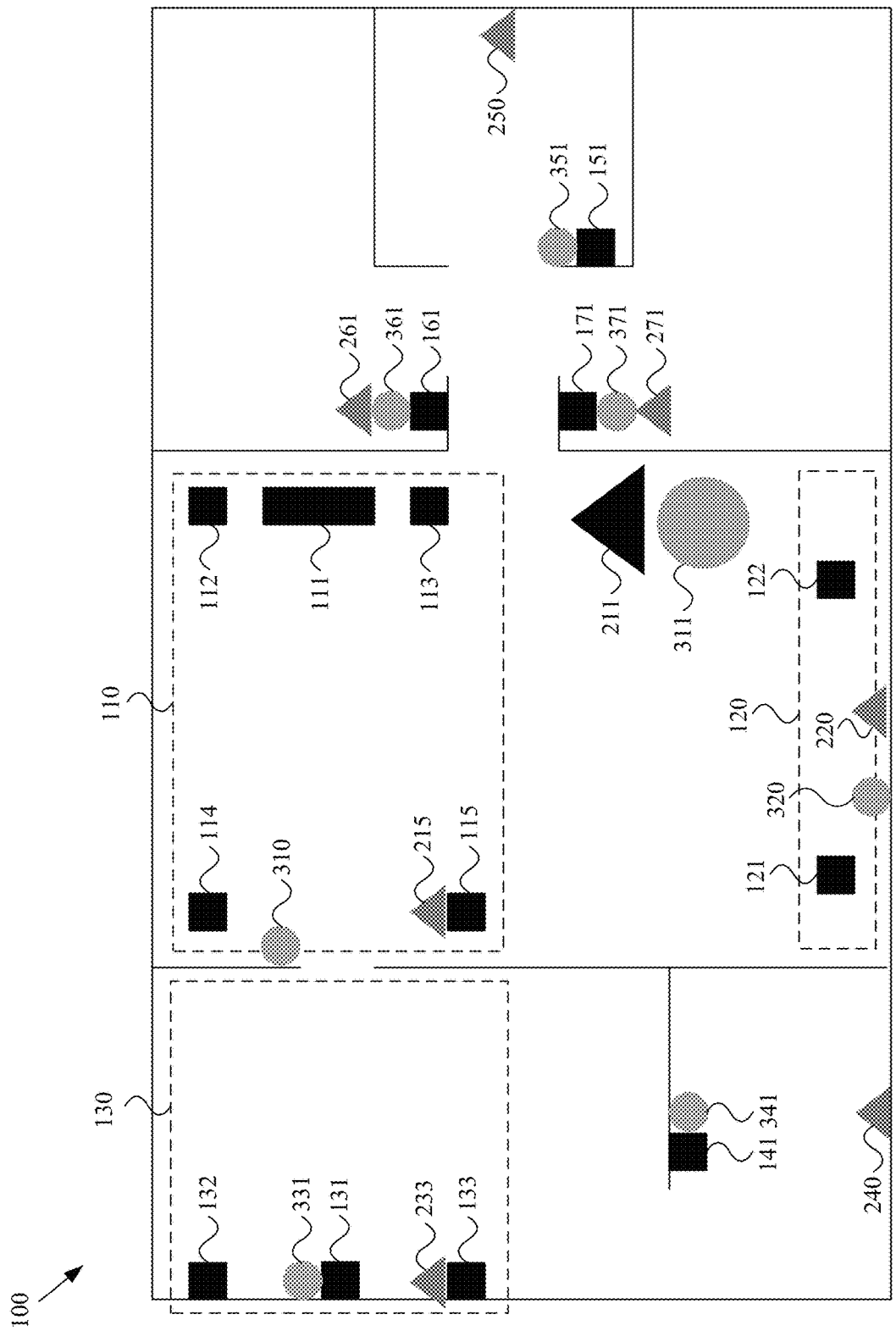
FIG. 1 is a diagram of an example multi-zone media environment, in accordance with various aspects of the present disclosure.

Various aspects of this disclosure provide a system and method for integrating a home media system and other home systems. As a non-limiting example, various aspects of this disclosure provide a system and method that flexibly and efficiently provide communication and/or resource sharing between a home media system and various other home systems.

DETAILED DESCRIPTION OF VARIOUS ASPECTS OF THE DISCLOSURE

The following discussion presents various aspects of the present disclosure by providing various examples thereof. Such examples are non-limiting, and thus the scope of various aspects of the present disclosure should not necessarily be limited by any particular characteristics of the provided examples. In the following discussion, the phrases "for example," "e.g.," and "exemplary" are non-limiting and are generally synonymous with "by way of example and not limitation," "for example and not limitation," and the like.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. Similarly, the term "module" may be utilized herein to refer to a pure hardware module and/or a hybrid hardware/software module (e.g., a processor that operates in accordance with software instructions stored in a memory or other non-transitory medium).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "has," "comprising," "including," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a device may be turned sideways so that its "top" surface is facing horizontally and its "side" surface is facing vertically, without departing from the teachings of the present disclosure.

Various aspects of the present disclosure a system and method for integrating a home media system and other home systems. As a non-limiting example, various aspects of this disclosure provide a system and method that flexibly and efficiently provide communication and/or resource sharing between a home media system and various other home systems.

The above and other aspects of the present disclosure will be described in or be apparent from the following description of various example implementations.

FIG. 1 is a diagram of an example multi-zone media environment 100, in accordance with various aspects of the present disclosure.

The example environment 100 comprises a variety of loudspeakers and groups thereof, spaced throughout an example premises (e.g., a home or private residence, office, campus, etc.). The discussion of various examples herein will often refer to the example environment 100. Though the example environment 100 and related examples are generally presented in the context of audio media system integration, it should be understood that the example environment 100 and all examples presented herein readily extend to the presentation of other forms of media (e.g., video media, etc.). Additionally, though the example environment 100 as discussed herein generally focuses on areas (or zones) within a premises structure (e.g., within a home, within an office, etc.), it should be understood that a premises in this discussion generally includes outdoor areas (e.g., a patio, deck, driveway, yard, sidewalk, car port, etc.) as well as indoor areas, unless otherwise specified.

The example environment 100 may, for example, comprise a first group of loudspeakers 110, which may also be referred to herein as a zone (or area). The first group of loudspeakers 110 may, for example, correspond to a first area (or audio zone) of a premises, for example a family room, media room, etc. The first group of loudspeakers 110 may, for example, comprise a central media controller 111. The central media controller 111 may comprise characteristics of any of a variety of central media controllers (e.g., an entertainment center, audio receiver, home media hub, home audio server, general purpose computer operating in accordance with software instructions, an Internet media access point or content server, etc.). The central media controller 111 may generally, for example, manage the presentation of media content throughout the example environment 100. Though the example environment 100 is generally shown and discussed as having a central media controller 111, it should be understood that the environment 100 may also operate in a mesh-type or decentralized or distributed configuration. For example, as will be discussed herein, any of the media devices (e.g., loudspeakers, etc.) discussed herein may perform any or all of the control functionality discussed herein.

The first group of loudspeakers 110 may also, for example, comprise a first (e.g., front left) loudspeaker 112, a second (e.g., front right) loudspeaker 113, a third (e.g., rear right) loudspeaker 114, and a fourth (e.g., rear left) loudspeaker 115. The central media controller 111 may also, for example, comprise a loudspeaker (e.g., integrated within the controller housing). Each of the first group of loudspeakers 110 may, for example, be operated independently or may be operated as a single group. Each of the first group of loudspeakers 110 may, for example, operate under the control of the central media controller 111 and/or operate autonomously. Note that the designations of the loudspeakers as left, right, front, rear, center, etc. may, but need not, refer to audio spatial arrangements generally synonymous with various loudspeaker arrangements (e.g., stereo, surround sound, monaural, etc.).

The example environment 100 may also, for example, comprise a second group of loudspeakers 120. The second group of loudspeakers 120 may, for example, comprise a first (e.g., right) loudspeaker 121 and a second (e.g., left) loudspeaker 122. The second group of loudspeakers 120 may, for example, correspond to a second area (or audio zone) of a premises, for example a kitchen or dining room, a break room, etc. Each of the second group of loudspeakers 120 may, for example, be operated independently or may be operated as a single group. Each of the second group of loudspeakers 120 may, for example, operate under the control of the central media controller 111 and/or operate autonomously. Also for example, any or all of the second group of loudspeakers 120 may operate with any or all of the other loudspeakers in the environment 100.

The example environment 100 may additionally, for example, comprise a third group of loudspeakers 130. The third group of loudspeakers 130 may, for example, comprise a first (e.g., central) loudspeaker 131, a second (e.g., right) loudspeaker 132, and a third (e.g., left) loudspeaker 133. The third group of loudspeakers 130 may, for example, correspond to a third area (or zone) of a premises, for example a master bedroom, garage, shop, etc. Each of the third group of loudspeakers 130 may, for example, be operated independently or may be operated as a single group. Each of the third group of loudspeakers 130 may, for example, operate under the control of the central media controller 111 and/or operate autonomously. Also for example, any or all of the third group of loudspeakers 130 may operate with any or all of the other loudspeakers in the environment 100.

The example environment 100 may further, for example, comprise a loudspeaker 141 in a fourth area (or room or zone) (e.g., in a master bath), a loudspeaker 151 in a fifth area (e.g., in a guest bath), a loudspeaker 161 in a sixth area (e.g., in a guest room), and a loudspeaker 171 in a seventh area (e.g., in an office). Though many examples presented herein include audio content presentation examples, the scope of this disclosure is not limited to audio content. For example, any or all of the loudspeakers shown and discussed herein may be video devices or audio/video devices without departing from the spirit and scope of this disclosure.

The example environment 100 may also comprise a security system (e.g., a home security system). For example, the environment 100 may comprise a security controller 211 that is communicatively coupled to any of a variety of security devices (e.g., infrared detectors, motion detectors, sound detectors, gas sensors, vibration sensors, cameras, microphones, scales, static sensors, touch pads, retinal scanners, fingerprint scanners, biometric detectors, alarm devices, emergency communication devices, etc.).

As shown in the example environment 100, the security system may comprise a plurality of stand-alone security devices. For example, the second area of the premises may comprise a second security device 220, the fourth area of the premises may comprise a fourth security device 240, and the fifth area of the premises may comprise a fifth security device 250. As discussed herein, any of such security devices may also be communicatively coupled to any or all of the media system components (e.g., the media controller 111, speakers, etc.) in addition to the security system. Such security devices may be communicatively coupled to any or all other components of the premises through direct one-to-one communication links, through central controllers, through one or more networks (e.g., local or personal area networks), etc.

As discussed herein, devices that may be utilized as security devices (e.g., sensors, etc.) may be incorporated into media devices and/or may be communicatively coupled to media devices. For example, a loudspeaker may comprise a motion detector sensor, a video monitor may comprise a carbon monoxide sensor, etc. For example, a sensor may be attached to and/or located within a loudspeaker or video display housing. In the example environment 100, the fourth loudspeaker 115 of the first group 110 may comprise a sensor 215 that may be utilized as a security device. Also, the third loudspeaker 133 of the third group 130 may comprise a sensor 233 that may be utilized as a security sensor, the loudspeaker 161 in the sixth area may comprise a sensor 261 that may be utilized as a security sensor, and the loudspeaker 171 in the seventh area may comprise a sensor 271 that may be utilized as a security sensor. For example, each of such sensors may be utilized by one or more systems. For example, the sensor 215 may be utilized by the premises media system and/or by the premises security system and/or by the premises automation system.

Such sensors, which may also be referred herein to as security devices, may be communicatively coupled to any or all other components of the premises through direct one-to-one communication links, through central controllers, through one or more communication networks (e.g., local or personal area networks), in any of a variety of different architectures (e.g., in a star configuration, in a ring configuration, in a mesh configuration, etc.), etc. For example, such sensor may be communicatively coupled to the security system controller 211 directly, via one or more communication network routers, via one or more components of the premises media system (e.g., via the media controller 111 and/or media devices coupled thereto), etc.

The example environment 100 may also comprise an automation (or control) system (e.g., a home automation system). For example, the environment 100 may comprise a home automation system controller 311 that is communicatively coupled to any of a variety of automation devices (e.g., thermometers, thermostats, light meters, switches, dimmers, heating ventilation and air conditioner (HVAC) monitors or controls, appliance sensors and controls, timers, moisture or humidity sensors, etc.).

As shown in the example environment 100, the premises automation system may comprise a plurality of stand-alone automation devices. For example, the first area (or zone) of the premises may comprise a first automation device 310, and the second area of the premises may comprise a second automation device 320. As discussed herein, any of such automation devices may also be communicatively coupled to any or all of the media system components (e.g., the media controller 111, speakers, etc.) in addition to the automation system. Such automation devices may be communicatively coupled to any or all other components of the premises through direct one-to-one communication links, through central controllers, through one or more networks (e.g., local or personal area networks), etc.

As discussed herein, devices that may be utilized as automation devices (e.g., sensors, controls, etc.) may be incorporated into media devices and/or may be communicatively coupled to media devices. For example, a loudspeaker may comprise a moisture sensor, a video monitor may comprise a thermometer, etc. For example, a device may be attached to and/or located within a loudspeaker or video display housing. In the example environment 100, the first loudspeaker 131 of the third group 130 may comprise a device 331 that may be utilized as an automation device. Also, the loudspeaker 141 of the fourth area may comprise a device 341 that may be utilized as an automation device, the loudspeaker 151 of the fifth area may comprise a device 351 that may be utilized as an automation device, the loudspeaker 161 in the sixth area may comprise a device 361 that may be utilized as an automation device, and the loudspeaker 171 in the seventh area may comprise a device 371 that may be utilized as an automation device. For example, each of such devices may be utilized by one or more systems. For example, device 331 may be utilized by the premises media system and/or by the premises automation system and/or by the premises security system.

Such devices, which may also be referred to herein as automation devices, may be communicatively coupled to any or all other components of the premises through direct one-to-one communication links, through central controllers, through one or more communication networks (e.g., local or personal area networks), etc. For example, such devices may be communicatively coupled to the automation system controller 311 directly, via one or more communication network routers, via one or more components of the premises media system (e.g., the media controller 111 and/or media devices coupled thereto), etc.

Figure 3:
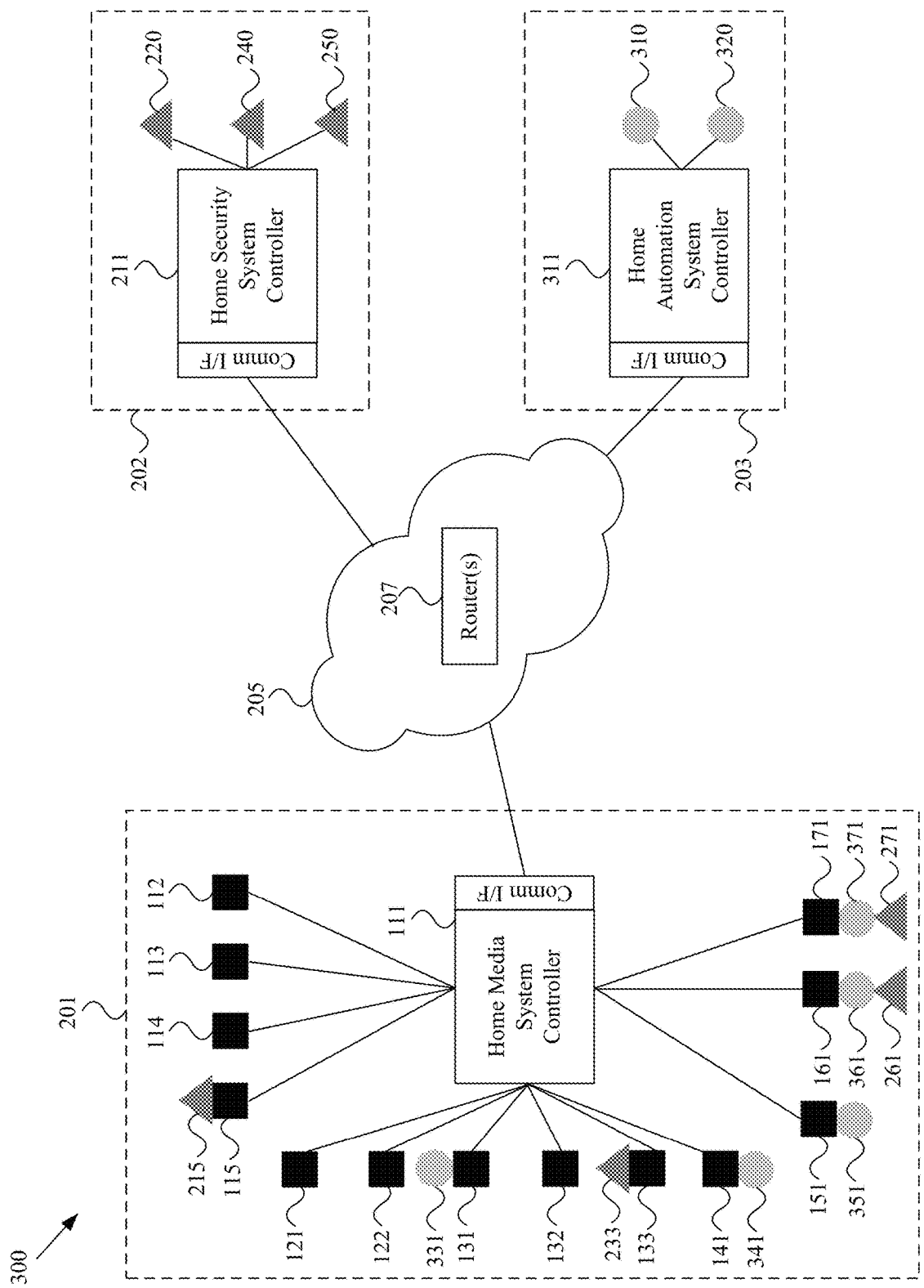
FIG. 3 is a diagram of an example home network environment, in accordance with various aspects of the present disclosure.
Figure 4:
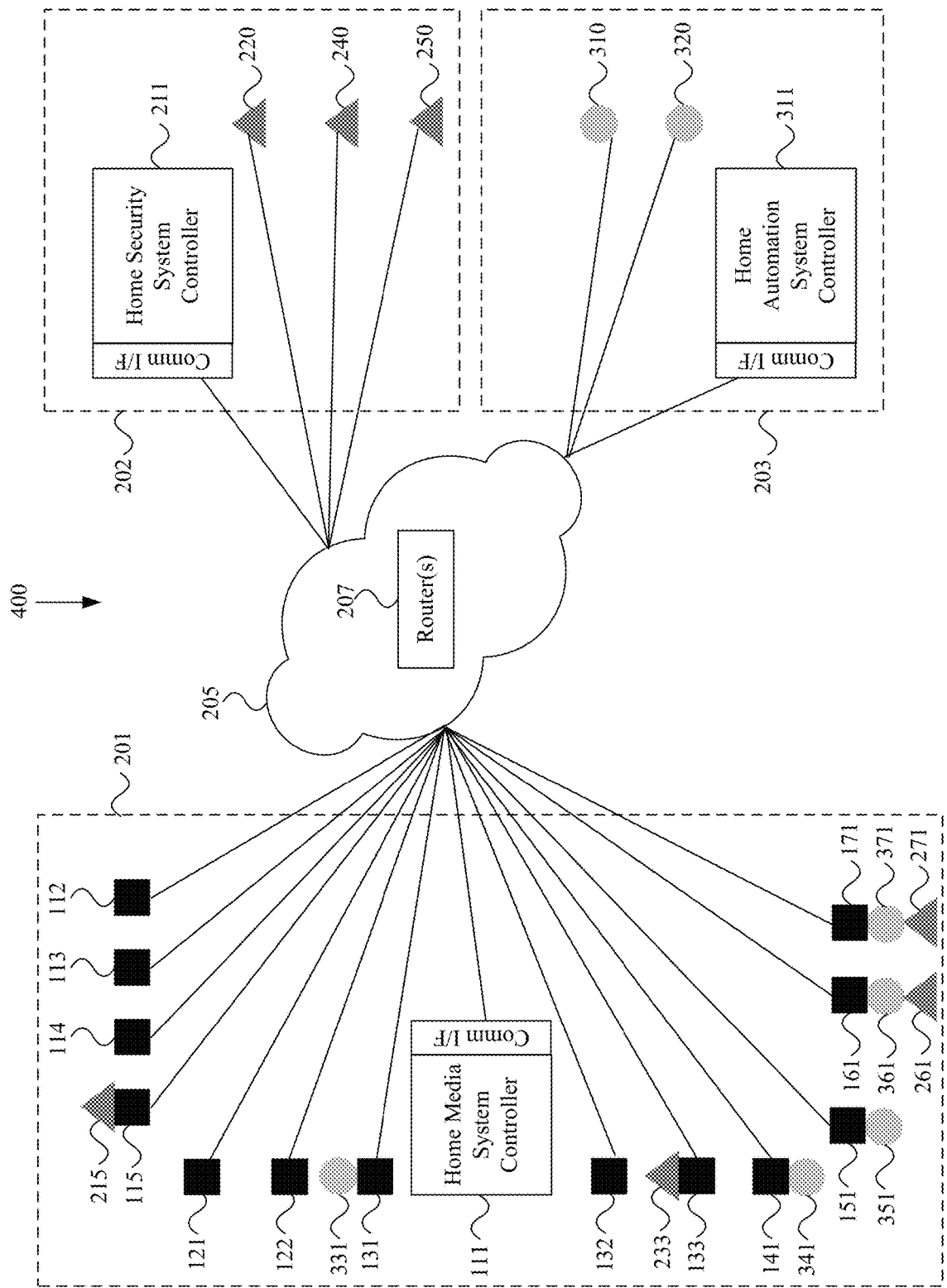
FIG. 4 is a diagram of an example home network environment, in accordance with various aspects of the present disclosure.

As explained herein, the various components of the premises or home systems (e.g., the premises media system, premises security system, premises automation system, etc.) may be communicatively coupled to each other in any of a variety of manners. Non-limiting examples of such communicative coupling are shown in FIGS. 2-4.

Figure 2:
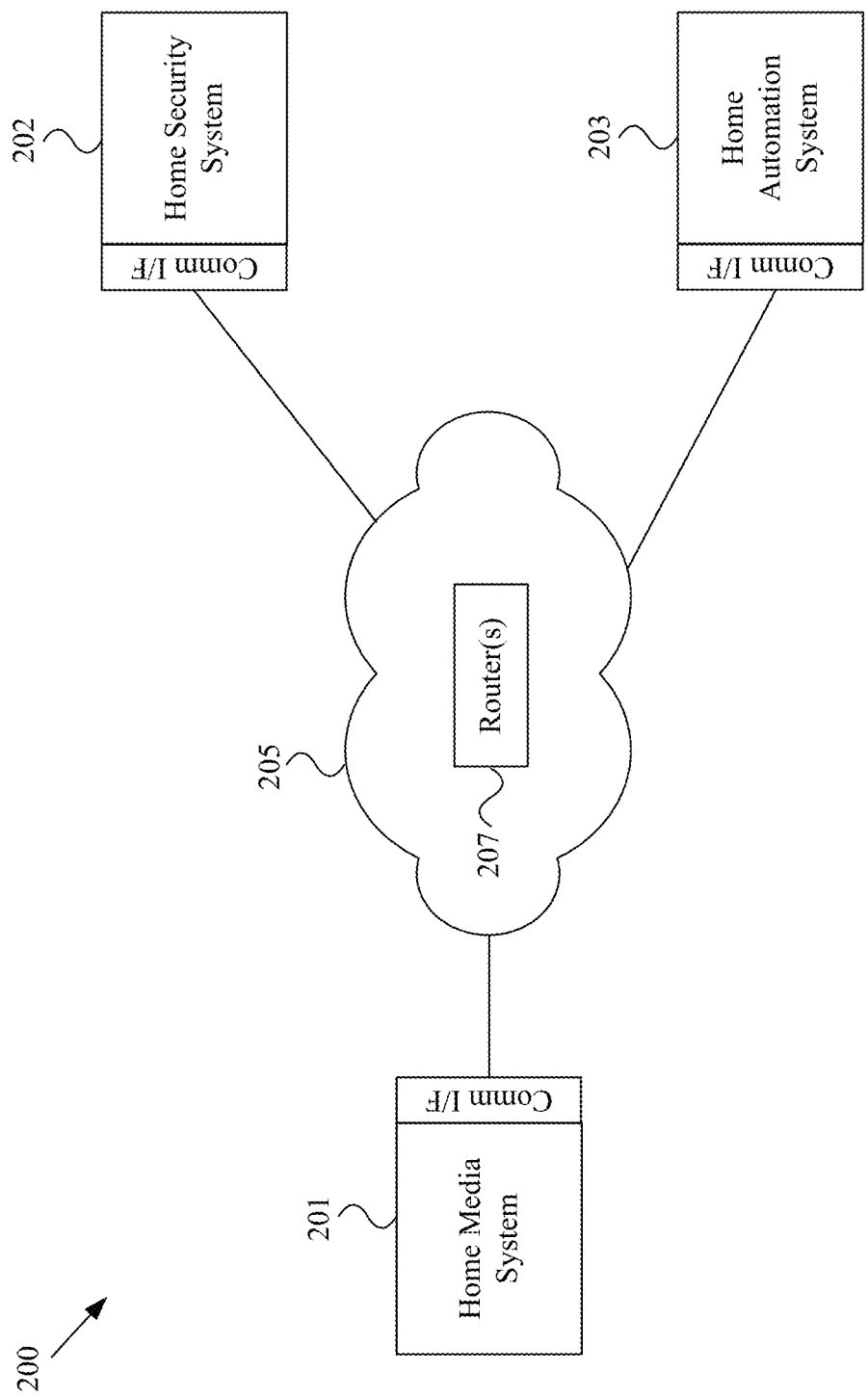
FIG. 2 is a diagram of an example home network environment, in accordance with various aspects of the present disclosure.

Referring to FIG. 2, such figure is a diagram of an example home (or premises) network environment 200, in accordance with various aspects of the present disclosure. The example environment 200 may, for example, share any or all characteristics with the example environment 100 shown in FIG. 1 and discussed herein.

The example environment 200 may, for example, comprise a home (or premises) media system 201. The home media system 201 may, for example, share any or all characteristics with the media system shown in FIG. 1 (e.g., media controller 111, media devices, etc.). The primary purpose of the home media system 201 may, for example, be to provide media content (e.g., audio content, video content, etc.), for example sound to one or more media presentations zones in a premises. For example, the home media system 201 may be generally adapted to provide music, audio programs, talk radio, etc. throughout a home. The example environment 200 may also, for example, comprise a home (or premises) security system 202. The home security system 202 may, for example, share any or all characteristics with the security system shown in FIG. 1 (e.g., security controller 211, security devices, etc.). The example environment 200 may, for example, comprise a home (or premises) automation system 203. The home automation system 203 may, for example, share any or all characteristics with the automation system shown in FIG. 1 (e.g., automation controller 311, automation devices, etc.).

The home media system 201, home security system 202, and home automation system 203 are communicatively coupled to each other through a communication network 205. For example, the home media system 201 (e.g., a media controller, media devices, etc.) may communicate with the home security system 202 (e.g., a security system controller, security devices, etc.) through the communication network 205. Also for example, the home media system 201 (e.g., a media controller, media devices, etc.) may communicate with the home automation system 203 (e.g., an automation controller, automation devices, etc.) through the communication network 205. Additionally for example, the home security system 202 (e.g., a security system controller, security devices, etc.) may communicate with the home automation system 203 (e.g., an automation controller, automation devices, etc.) through the communication network 205.

The communication network 205 may, for example, comprise characteristics of any one or more of a variety of types of communication networks (e.g., local area networks, personal area networks, wide area networks, etc.). For example, the communication network 205 may comprise any one or more of a variety of communication media (e.g., wired, wireless, tethered optical, non-tethered optical, cable, telephone line, power line, etc.) utilizing any one or more of a variety of communication protocols (e.g., Wi-Fi, Bluetooth, Ethernet, MoCA, TCP/IP, cellular protocols, cable network protocols, optical network protocols, etc.). The communication network 205 may, for example, comprise one or more routers 207 to manage traffic between the nodes of the communication network 205.

In the example environment 200, the home media system 201, home security system 202, and home automation system 203 are each shown with a respective communication interface front end that manages respective communications with the communication network 205 and/or with each other via the communication network 205. Each of the separate systems may, for example, comprise a single point of contact (e.g., at their respective controllers) with which other systems may communicate. FIG. 3 shows an example system environment 300 in which respective system controllers may communicate directly with each other through the communication network 205, but in which communication with the individual devices (e.g., non-controller devices) in each system is managed by the respective system controller.

More particularly, FIG. 3 is a diagram of an example home (or premises) network environment 300, in accordance with various aspects of the present disclosure. The example environment 300 may, for example, share any or all characteristics with the example environment 100 shown in FIG. 1 and/or the example environment 200 shown in FIG. 2, which are discussed herein. For example, the example environment 300 logically arranges aspects of the example environments 200 and 100 into primary respective systems.

For example, the example home media system 201 is shown as a group comprising the media controller 111 and media devices 112, 113, 114, 115, 121, 122, 131, 132, 133, 141, 151, 161, and 171. As shown, the media devices 112-171 are grouped with the media controller 111, even though as discussed herein at least some of such media devices, or components thereof, may be utilized by the home security system 202 and/or the home automation system 203. Similarly, the sensor devices 215, 233, 261, and 271 are each grouped with respective media devices 115, 133, 161, and 171 with which they are integrated or logically associated; and the devices 331, 341, 351, 361, and 371 are each group with respective media devices 131, 141, 151, 161, and 171 with which they are integrated or logically associated. Also for example, the example home security system 202 is shown as a group comprising the security controller 211 and security devices 220, 240, and 250. As shown, the security devices 220, 240, and 250 are grouped with the security controller 211, even though as discussed herein at least some of such security devices may be utilized by the home media system 201 and/or the home automation system 203. Additionally for example, the example home automation system 203 is shown as a group comprising the automation controller 311 and automation devices 310 and 320. As shown, the automation devices 310 and 320 are grouped with the automation controller 311, even though as discussed herein at least some of such automation devices may be utilized by the home media system 201 and/or the home security system 202.

As also shown in FIG. 2, the home media system 201, home security system 202, and home automation system 203 are communicatively coupled to each other through a communication network 205. For example, the home media system 201 (e.g., a media controller, media devices, etc.) may communicate with the home security system 202 (e.g., a security system controller, security devices, etc.) through the communication network 205. Also for example, the home media system 201 (e.g., a media controller, media devices, etc.) may communicate with the home automation system 203 (e.g., an automation controller, automation devices, etc.) through the communication network 205. Additionally for example, the home security system 202 (e.g., a security system controller, security devices, etc.) may communicate with the home automation system 203 (e.g., an automation controller, automation devices, etc.) through the communication network 205. Various non-limiting aspects of the example communication network 205 were presented in the discussion of FIG. 2 and are presented elsewhere herein.

In the example environment 300, the home media system 201, home security system 202, and home automation system 203 are each shown with a respective communication interface front end, located in a respective controller 111, 211, and 311, which manages respective communications with and through the network 205. Each of the separate systems may, for example, comprise a single point of contact (e.g., at their respective controllers) with which other systems may communicate. In an example in which the communication network 205 comprises a Wi-Fi wireless network, each of the controllers 111, 211, and 311 may comprise one or more respective Wi-Fi addresses on the network.

In the example environment 300 the media system controller 111, security system controller 211, and automation system controller 311 may communicate with each other directly through the communication network 205, and may utilize various resources of the other systems via their respective controllers. For example, the security system controller 211 may communicate with the media system controller 111 to utilize any or all of the devices of the media system 201 and/or may communicate with the automation system controller 311 to utilize any or all of the devices of the automation system 203. Also for example, the automation system controller 311 may communicate with the media system controller 111 to utilize any or all of the devices of the media system 201 and/or may communicate with the security system controller 211 to utilize any or all of the devices of the security system 202. Additionally for example, the security system controller 211 may communicate with the media system controller 111 to utilize any or all of the devices of the media system 201 and/or may communicate with the automation system controller 311 to utilize any or all devices of the automation system 203. Though for illustrative purposes the discussion herein primarily concerns resource sharing between the media system 201 and the other systems (e.g., the security system 202 and the automation system 203), the various aspects of this disclosure readily apply to resource sharing between the security system 202 and the automation system 203 and/or other systems (e.g., home or premises systems).

In the environment or network architecture shown in FIG. 3, a respective controller for a system (e.g., the media system controller 111 of the media system 201) may, for example, readily maintain control over the use of the system's resources by the other systems. For example, in a scenario in which the security system controller 211 desires to utilize a motion sensor 233 of a speaker 133, the security system controller 211 may communicate a request for such utilization to the media system controller 111. The media system controller 111 may then, for example, determine whether the requested utilization is allowed and/or may manage the utilization of the resource. In another example scenario in which the automation system controller 311 desires to utilize a temperature sensor 341 of a speaker 141, the automation system controller 311 may communicate a request for such utilization to the media system controller. In yet another example scenario in which the automation system controller 311 desires to utilize a loudspeaker resource 151 to conduct a two-way communication with a user, the automation system controller 311 may communicate with the media system controller 111 to manage the utilization.

In the example environment 300, each of the system controllers 111, 211, and 311 comprises a respective communication interface with its system resources (e.g., non-controller devices). For example, the media system 111 comprises a communication interface with which it can directly communicate with the resources of the media system 201. The communication between the media system 111 and the resources of the media system 201 may, for example, be conducted via a communication network or portion (e.g., channel) thereof to which the home security system 202 and/or the home automation system 203 might not have access. For example, each of the systems 201, 202, and 203 may operate over a respective communication network that is not open to the other systems (e.g., different respective communication media, different respective protocols, different respective channels of a same communication network, etc.). Similarly, the security system controller 211 may comprise a communication interface with which it can directly communicate with the resources of the security system 202, and the home automation system controller 311 may comprise a communication interface with which it can directly communicate with the resources of the automation system 203.

In various example implementations, the communication between components of each of the systems 201, 202, and 203 may be performed over a single common communication network (e.g., a local area network for a premises or home, a wide area network, the Internet, etc.). For example, any or all components of the various systems 201, 202, and 203 may be communicatively coupled to and/or accessible over a single common communication network. FIG. 4 provides an example of such a configuration.

In particular, FIG. 4 is a diagram of an example home network environment 400, in accordance with various aspects of the present disclosure. As opposed to the example environments 200 and 300 of FIGS. 2 and 3, the example network environment 400 comprises all of the components (or resources or devices) of each of the premises (or home) systems communicatively coupled to a same common communication network (e.g., a premises-based or home-based communication network).

For example, the media controller 111 and the various media devices thereof 112-171 are communicatively coupled to the network 205. The various sensors and other devices (e.g., 215, 233, 261, 271, 331, 341, 351, 361, and 371), which may be utilized as security devices and/or automation devices, may be directly coupled to the communication network 205 and/or may be coupled to the communication network 205 through their respective media devices. For example, a sensor 215 (e.g., a motion detector, light detector, gas sensor, microphone, etc.) integrated with a media device 115 (e.g., a loudspeaker) may be directly coupled to the communication network 205 and/or may communicate with the communication network 205 through interface circuitry of the media device 115. The security controller 211 may then access the sensor 215 through the communication network 205 accordingly. Also for example, a device 361 (e.g., a thermometer, a light sensor, switch, etc.) integrated with a media device 161 (e.g., a video monitor) may be directly coupled to the communication network 205 and/or may communication with the communication network 205 through interface circuitry of the media device 161. The automation controller 311 may then access the device 361 through the communication network 205 accordingly.

Similarly, the security controller 211 and the various security devices (e.g., 220, 240, and 250) may be directly coupled to the communication network 205 and/or coupled to the communication network 205 through intermediate devices. Also, the automation controller 310 and the various automation devices (e.g., 310 and 320) may be directly coupled to the communication network 205 and/or coupled to the communication network 205 through intermediate devices.

Direct coupling between the various media system, security system, and/or automation system components and the common communication network 205 may provide various advantages. For example, the media system controller 111 need not be powered up for the security system 202 and/or automation system 203 to utilize resources of the media system 201. Similarly, the security system controller 211 need not be powered up for the media system 201 and/or automation system 203 to utilize resources of the security system 202, and the automation system controller 311 need not be powered up for the media system 201 and/or the security system 202 to utilize resources of the automation system 203.

It should be noted that any of a variety of communication network configurations may be utilized to communicatively couple any of the components discussed herein. For example, any or all of the components illustrated in FIGS. 1-4 may be communicatively coupled in a mesh configuration (e.g., in a propriety architecture and/or in accordance with a standard communication protocol, such as Bluetooth, Wi-Fi, etc.) and/or may form ad hoc communication networks.

Various aspects of this disclosure will now be presented in discussions of various example method flows. It should be understood that the method flows are presented and discussed as mere examples of various aspects, and that the scope of this disclosure should not be limited by characteristics of any particular example method or combination of methods.

Figure 5:
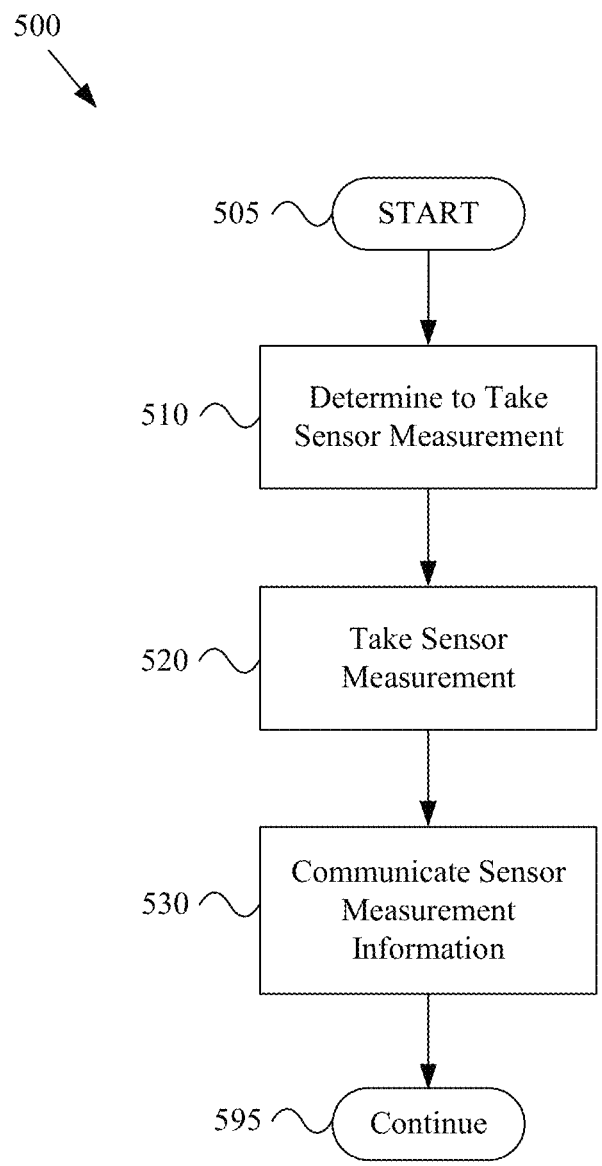
FIG. 5 is a flow diagram of an example method for integrating sensor aspects of home systems, in accordance with various aspects of the present disclosure.

FIG. 5 is a flow diagram of an example method 500 for integrating sensor aspects of home systems, in accordance with various aspects of the present disclosure. The example method 500 may, for example, share any or all characteristics with the other methods discussed herein (e.g., with regard to FIGS. 6-8). For example, any or all blocks of the example method 500 may be integrated into any of such methods and vice versa. Additionally for example, the example method 500 may be implemented in any of the example environments shown in FIGS. 1-4 and/or presented in the discussions thereof.

The example method 500 and/or any portion thereof may, for example, be implemented by any of the systems presented herein (e.g., media system 201, security system 202, automation system 203, etc.) or any portion thereof (e.g., controller, device, or other component). Though most of the examples discussed herein generally concern utilization of premises (or home) media system resources (e.g., sensor resources, media output resources, user input resources, control resources, etc.) with or by other systems, the scope of this disclosure applies as well to utilization of components of other systems by the premises (or home) media system and/or to utilization of components of a first other system by a second other system.

The example method 500 begins executing at block 505. The example method 500 may begin executing in response to any of a variety of causes or conditions. The method 500 may, for example, begin executing when a system implementing the method 500 is powered up, reset, or turned on. The method 500 may also, for example, begin executing when a system implementing the method 500 receives a command from a user to operate and/or operate with other systems (e.g., receiving a command directly at the system, receiving a command from a remote controller, receiving a command from a user's smart phone, etc.). The method 500 may further, for example, begin executing in response to a system or component thereof (e.g., a controller, device, etc.) exiting from a sleep mode. The method 500 may also, for example, begin executing in response to a system implementing the method 500 receiving a message from another system, for example a message regarding resource sharing (e.g., regarding utilization of a sensor device of the media system). Still further for example, block 505 may receive execution flow from any of the blocks of the example method 500 and/or from any flow diagram block discussed herein (e.g., with regard to FIGS. 6-8). In general, the method 500 may begin executing in response to any of a variety of causes or conditions. Accordingly, the scope of this disclosure should not be limited by characteristics of any particular initiating cause or condition.

The example method 500 may, at block 510, comprise determining to take a sensor measurement. Block 510 may be performed by any of a variety of system components. For example, Block 510 may be performed by a controller of a media system (e.g., the media controller 111) and/or a device of the media system other than a controller (e.g., any of the devices of the media system 201 shown in FIGS. 1-4, for example media output devices, media input devices, sensor devices, control devices, etc.). Block 510 may comprise determining to take a sensor measurement in any of a variety of manners, non-limiting examples of which are presented herein.

Block 510 may, for example, comprise determining to take a sensor measurement based, at least in part, on receiving a message requesting a sensor measurement. For example, block 510 may comprise a media controller (e.g., the media controller 111) receiving a message from another system (e.g., the security system 202, the automation system 203, etc.) or component thereof requesting a sensor measurement from a sensor of the media system 201. In an example scenario, block 510 may comprise the media system controller 111 receiving a message from the security system controller 211 requesting a sensor measurement from the master bedroom sensor 233, which is integrated with the third loudspeaker 133. Based at least in part on such a received message, the media system controller 111 may determine to perform the requested sensor measurement. In another example scenario, the loudspeaker 171 may receive a message from the automation system controller 311 requesting a measurement from the temperature sensor 371 that is integrated with the loudspeaker 171. Based at least in part on such a received message, the loudspeaker 171 may determine to perform the requested sensor measurement.

Block 510 may also, for example, comprise determining to take a sensor measurement based, at least in part, on a timer. For example, block 510 may comprise determining to take a sensor measurement periodically based on a time period (e.g., every N seconds, every M minutes, etc.), on a programmed time schedule (e.g., at predetermined times of day, etc.), etc. In an example scenario, the media device 161 (e.g., a loudspeaker) comprising sensor 261 may be set up (e.g., programmed) to utilize the sensor 261 onboard the media device 261 to acquire an infrared image of a room every fifteen seconds. In another example scenario, the media device 141 may be set up to utilize the sensor 341 onboard the media device 141 to take a temperature measurement every five minutes.

Block 510 may additionally, for example, comprise determining to take sensor measurements continually. For example, a media device 133 comprising an onboard (or otherwise coupled) smoke detector sensor 233 may continually monitor the atmosphere for smoke.

Block 510 may further, for example, comprise determining to take a sensor measurement based, at least in part, on a detected event. For example, block 510 may comprise determining to take a second sensor measurement based at least in part on an event detected by a first sensor. In an example scenario, block 510 may comprise determining to utilize a sensor to acquire an infrared image from a sensor based on a detected noise from a microphone sensor and/or a detected vibration from a vibration sensor.

As mentioned herein, the sensors of the various systems may comprise characteristics of any of a variety of types of sensors (infrared or thermal detectors, motion detectors, sound detectors, gas sensors, vibration sensors, cameras, microphones, weight sensors, static sensors, touch pads, retinal scanners, fingerprint scanners, biometric detectors, alarm devices, emergency communication devices, etc.). The sensors may be physically integrated with a media device (e.g., a speaker, a video monitor, etc.) or may be separate from but communicatively coupled to a media device (e.g., utilizing a personal area network link, near field communication link, etc.).

In general, block 510 may comprise determining to take a sensor measurement. Accordingly, the scope of various aspects of this disclosure should not be limited by characteristics of any particular manner of determining to take a sensor measurement.

The example method 500 may, at block 520, comprise taking the sensor measurement. For example, Block 520 may be performed by a controller of a media system (e.g., the media controller 111) and/or a device of the media system other than a controller (e.g., any of the devices of the media system 201 shown in FIGS. 1-4, for example media output devices, media input devices, sensor devices, control devices, etc.). Block 520 may comprise taking the sensor measurement in any of a variety of manners, non-limiting examples of which are presented herein. For example, block 520 may comprise taking the sensor measurement in accordance with the sensor being utilized.

As discussed herein various sensors may be stand-alone sensors or may be integrated with media devices (e.g., loudspeakers, video displays, etc.). In a scenario in which a sensor is integrated with another device, for example a media device, the other device may manage operation of the sensor. Alternatively, the sensor may be autonomous, for example comprising its own operational and/or communicational capability.

For example, in an example scenario in which the sensor 215 is integrated with the media device 115, the media device 115 may comprise a controller (e.g., a sensor manager module) that operates the sensor 215. In an alternative scenario, for example, the sensor 215 may be co-located in a housing of the media device 115 but may otherwise operate independent of the media device 115.

In general, block 520 may comprise taking the sensor measurement. Accordingly, the scope of this disclosure should not be limited by characteristics of any particular manner of taking a sensor measurement.

The example method 500 may, at block 530, comprise communicating sensor measurement information. For example, Block 530 may be performed by a controller of a media system (e.g., the media controller 111) and/or a device of the media system other than a controller (e.g., any of the devices of the media system 201 shown in FIGS. 1-4, for example media output devices, media input devices, sensor devices, control devices, etc.). Block 530 may comprise communicating sensor measurement information in any of a variety of manners, non-limiting examples of which are presented herein.

For example, in a scenario in which block 510 comprised receiving a request for a sensor measurement, block 530 may comprise communicating information of the sensor measurement back to the requesting entity. For example, in an example scenario in which the security system controller 211 communicated a request via the network 205 to the media controller 111 for a measurement from the sensor 261 associated with the media resource 161, block 530 may comprise the media controller 111 communicating the sensor measurement information back to the security system controller 211, for example after the media controller 111 communicates with the media resource 161 or sensor 261 to obtain the sensor information. Also for example, in an example scenario in which the media device 151 receives a request from the automation system controller 311 for a temperature measurement from the sensor 361, block 530 may comprise the media device 151 communicating the sensor measurement information back to the automation system controller 311.

Block 530 may, for example, comprise communicating the sensor measurement information to a known recipient, for example in an asynchronous fashion. For example in an example scenario in which block 510 determines to take a sensor measurement in response to a timer, block 530 may comprise communicating the sensor measurement information to a predetermined recipient of the sensor measurement. For example, in an example scenario in which a measurement is taken from the sensor 341 (e.g., a humidity sensor, temperature sensor, etc.) every fifteen minutes, the sensor 341 (or the media controller 111) may communicate the sensor measurement information to the automation controller 311. Such sensing and communicating may, for example, be performed without being triggered each time by a particular message from the automation controller 311. In another example scenario in which a sensor 233 (e.g., a window latch sensor) detects a potential security event, the sensor 233 may immediately communicate information of the detected event to the security system controller 211 (e.g., directly through the communication network 205, through the media controller 111 and the communication network 205, through the media device 133 and the media controller 111 and the network 205, etc.).

In general, block 530 may comprise communicating sensor measurement information. Accordingly, the scope of this disclosure should not be limited by characteristics of any particular manner of communicating sensor measurement information.

The example method 500 continues execution at block 595. The continued execution may comprise any of a variety of characteristics. For example, block 595 may comprise looping execution flow back up to any of the previous blocks of the example method 500 and/or to any flow diagram block discussed herein. For example, block 595 may loop execution flow back up to block 510 for continued determination to take sensor measurements, sensor measurement taking, and sensor measurement communicating.

As stated herein, though many of the examples provided herein concern utilization of resources of the media system by other systems, the scope of this disclosure also includes utilization of resources of other systems by the media system and/or utilization of resources of another system by another system. For example, any or all of the aspects of the example method 500 may be performed by a security system controller and/or other device, and any or all of the aspects of the example method 500 may be performed by an automation system controller and/or other device. In an example scenario, a premises (or home) media system may operate in a manner that depends on user location within a premises and/or user interaction with various sensors. Various examples of such operation are, for example, presented in U.S. application Ser. No. 14/725,904, filed May 29, 2015, titled "Multi-zone Media System and Method for Providing Multi-zone Media;" U.S. application Ser. No. 14/726,019, filed May 29, 2015, titled "System and Method for Providing User Location-based Multi-zone Media;" and U.S. application Ser. No. 14/726,109, filed May 29, 2015, titled "System and Method for Selecting and Providing Zone-Specific Media;" the contents of each of which are hereby incorporated herein by reference in their entirety. Any or all of such media system examples may, for example, utilize resources (e.g., sensor and/or control resources) of the media system and/or of other premises-based systems, for example a premises security system and/or a premises automation system operating in accordance with one or more blocks of the example method 500.

In addition to various systems sharing sensor resources (e.g., a home media system sharing sensor resources of the home media system with other systems), the various systems may also share media output resources. Various non-limiting examples of such media output resource sharing are presented herein.

Figure 6:
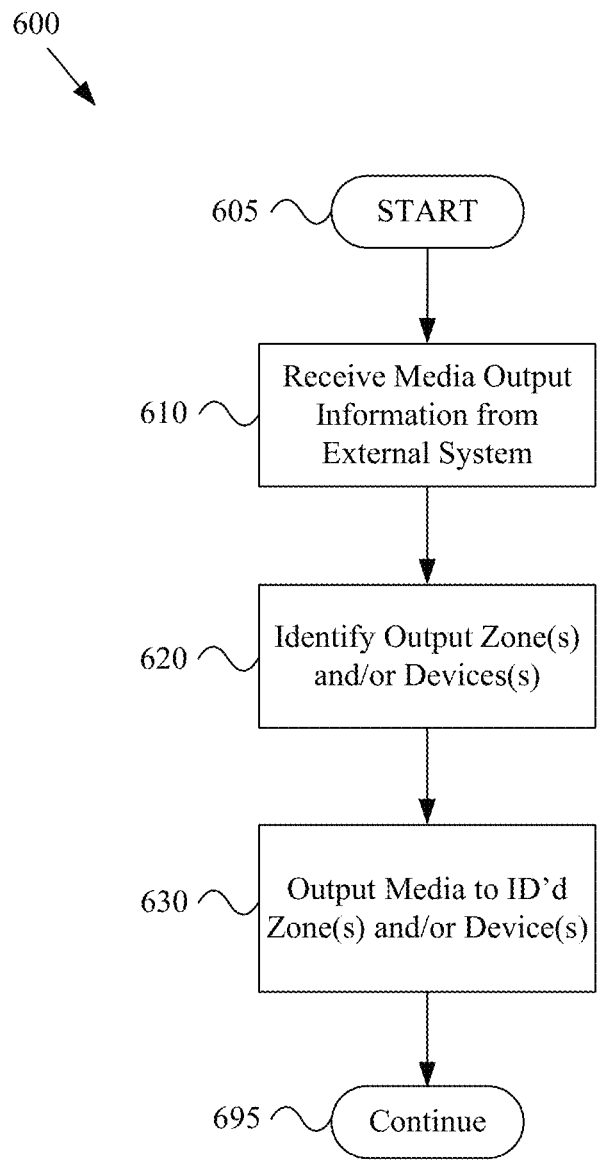
FIG. 6 is a flow diagram of an example method for integrating media output aspects of home systems, in accordance with various aspects of the present disclosure.

FIG. 6 is a flow diagram of an example method 600 for integrating media output aspects of home systems, in accordance with various aspects of the present disclosure. The example method 600 may, for example, share any or all characteristics with the other methods discussed herein (e.g., with regard to FIGS. 5, 7, and 8). For example, any or all blocks of the example method 500 may be integrated into any of such methods and vice versa. Additionally for example, the example method 600 may be implemented in any of the example environments shown in FIGS. 1-4 and/or presented in the discussions thereof.

The example method 600 and/or any portion thereof may, for example, be implemented by any of the systems presented herein (e.g., premises media system 201, premises security system 202, premises automation system 203, etc.) or any portion thereof (e.g., controller or other component). Though most of the examples discussed herein generally concern utilization of home media system resources (e.g., sensor resources, media output resources, user input resources, control resources, etc.) with or by other systems, the scope of this disclosure applies as well to utilization of components of other systems by the home media system and/or to utilization of components of a first other system by a second other system.

The example method 600 begins executing at block 605. The example method 600 may begin executing in response to any of a variety of causes or conditions. The method 600 may, for example, begin executing when a system implementing the method 600 is powered up, reset, or turned on. The method 600 may also, for example, begin executing when a system implementing the method 600 receives a command from a user to operate and/or operate with other systems (e.g., receiving a command directly at the system, receiving a command from a remote controller, receiving a command from a user's smart phone, etc.). The method 600 may further, for example, begin executing in response to a system or component thereof (e.g., a controller, device, etc.) exiting from a sleep mode. The method 600 may also, for example, begin executing in response to a system implementing the method 600 receiving a message from another system, for example a message regarding resource sharing (e.g., regarding utilization of a media output device of the media system). Still further for example, block 605 may receive execution flow from any of the blocks of the example method 600 and/or from any flow diagram block discussed herein (e.g., with regard to FIGS. 5, 7, and 8). In general, the method 600 may begin executing in response to any of a variety of causes or conditions. Accordingly, the scope of this disclosure should not be limited by characteristics of any particular initiating cause or condition.

The example method 600 may, at block 610, comprise receiving media output information from an external system (e.g., an external premises or home security system, an external premises or home automation system, etc.). The external system may, for example, be different from a media server. In other words, in an example scenario in which a home media system implements one or more aspects of the example method 600, block 610 may comprise receiving media output information from one or more other home systems in addition to typical media server systems (e.g., home media server systems, remote media streaming services, etc.).

Block 610 may be performed by any of a variety of system components. For example, Block 610 may be performed by a controller of a media system (e.g., the media controller 111) and/or a device of the media system other than a controller (e.g., any of the devices of the media system 201 shown in FIGS. 1-4, for example media output devices, media input devices, sensor devices, control devices, etc.). Block 610 may comprise receiving media output information in any of a variety of manners, non-limiting examples of which are presented herein.

Block 610 may, for example, comprise receiving the media output information from the external system in a message data structure and/or series of packets communicated through a home communication network (e.g., through the communication network 205). The packets may, for example, be formatted and/or encoded in a proprietary and/or standard manner. For example, audio information may be encoded in any of a variety of manners (e.g., MP3, AAC, AC3, ALAC, AMR, MP3, WAV, etc.), and video information may be encoded in any of a variety of manners (e.g., MPEG-2, MPEG-4, AVC, DivX, etc.). Block 610 may, for example, comprise receiving the media output information in an audio and/or video streaming format.

Block 610 may, for example, comprise receiving the media output information in a synchronous or asynchronous manner. For example, an external system may communicate the media output information whenever the need arises, and thus such information may be received by the entity implementing block 610 at any time. Additionally, block 610 may comprise receiving the media output information in a synchronous manner, for example in which the recipient of the media output information performs synchronous hand-shaking with the provider of the media output information during the communication.

In an example scenario, the media controller 111 (or other media device discussed herein) may receive the media output information from the security system controller 211. Such media output information may, for example, include audio and/or video alarm information. For example, the received media output information may comprise audio information warning of a potential danger (e.g., a high level of carbon monoxide, smoke, higher-than-normal temperature level, a window being opened, a door being impacted, a potential intruder, etc.). In another example scenario, the media controller 111 (or other media device discussed herein) may receive the media output information from the automation system controller 311. For example, the received media output information may comprise audio information notifying a user that a light has been left on, that the HVAC system is in need of maintenance, that a temperature level has been changed or is about to be changed, that a refrigerator door is open, that an oven or cooktop burner has been left on, etc.

In general, block 610 may comprise receiving media output information from an external system. Accordingly, the scope of this disclosure should not be limited by characteristics of any particular type of media output information or of any particular manner of receiving such information.

The example method 600 may, at block 620, comprise identifying a media output zone and/or media output devices for outputting the media output information received at block 610. Block 610 may be performed by any of a variety of system components. For example, Block 620 may be performed by a controller of a media system (e.g., the media controller 111) and/or a device of the media system other than a controller (e.g., any of the devices of the media system 201 shown in FIGS. 1-4, for example media output devices, media input devices, sensor devices, control devices, etc.). Block 620 may comprise performing such identifying in any of a variety of manners, non-limiting examples of which are presented herein.

For example, block 620 may comprise always outputting the media output information to all zones. Also for example, block 620 may comprise identifying one or more zones that are most relevant to a user. For example, block 620 may comprise identifying one or more media presentation zones (or areas) in which a user has indicated a presence and/or a desire for the presentation of media content. Various examples of such operation are presented in U.S. application Ser. No. 14/725,904, filed May 29, 2015, titled "Multi-zone Media System and Method for Providing Multi-zone Media," the contents of which are hereby incorporated herein by reference in their entirety.

Also for example, block 620 may comprise identifying one or more media presentation zones (or areas) that coincide with tracked user movement (e.g., user movement in general, movement of a particular user, etc.). Various examples of such operation are presented in U.S. application Ser. No. 14/726,019, filed May 29, 2015, titled "System and Method for Providing User Location-based Multi-zone Media," the contents of which are hereby incorporated herein by reference in their entirety. For example, block 620 may comprise identifying one or more zones or associated media output devices that coincide with user movement throughout a home or premises.

Additionally for example, in an example scenario in which the media output information is particularly relevant to a zone (or area) of a residence, block 620 may comprise identifying one or more media presentation zones (or areas) that are most appropriate for the media output information. Various examples of such operation are presented in U.S. application Ser. No. 14/726,109, filed May 29, 2015, titled "System and Method for Selecting and Providing Zone-Specific Media," the contents of each of which are hereby incorporated herein by reference in their entirety. For example, in an example scenario in which a media output information is related to a utility room (e.g., for example communications regarding temperature settings, water softener operation or maintenance, water heater maintenance, etc.), block 620 may comprise identifying a utility room zone and/or associated media output devices as the zone or devices at which to present the received media output information.

Block 620 may, for example, comprise identifying one or more media output zones based, at least in part, on a priority associated with the media output information received at block 610. For example, in a scenario in which the media output information received at block 610 is associated with a high-priority security alert (e.g., a fire alarm, an intruder alert, etc.), block 620 may comprise determining to immediately present the received media output information to all zones and/or media output devices. Also for example, in a scenario in which the media output information received at block 610 is associated with a relatively low-priority informative message (e.g., a message that the user is low on laundry detergent, a message that the water softener is low on salt, etc.), block 620 may comprise determining to present the received media output information only in a particular zone in which the user is located or a zone that is most relevant to the media output information.

In general, block 620 may comprise identifying one or more media output zones and/or media output devices for outputting the media output information received at block 610. Accordingly, the scope of this disclosure should not be limited by characteristics of any particular manner of identifying one or more media output zones and/or media output devices for outputting media information.

The example method 600 may, at block 630, comprise outputting the media output information received at block 610 to the media presentation zones and/or media devices identified at block 620. Block 630 may be performed by any of a variety of system components. For example, Block 630 may be performed by a controller of a media system (e.g., the media controller 111) and/or a device of the media system other than a controller (e.g., any of the devices of the media system 201 shown in FIGS. 1-4, for example media output devices, media input devices, sensor devices, control devices, etc.). Block 630 may, for example, be performed in any of a variety of manners, non-limiting examples of which are presented herein.

For example, in block 630 may comprise a media controller (e.g., the media controller 111) communicating the media output information to the media output devices identified at block 620, which in turn output the media output information. If needed, for example, block 630 may comprise transposing the received media output information from a first media format (e.g., encoding format, packet format, etc.) to a second media format recognized or preferred by the media output devices.

Block 630 may also, for example, comprise determining output characteristics for the media output. For example, block 630 may comprise determining a volume at which to output the media output information received at block 610. Block 630 may, for example, comprise determining to maximize or substantially increase volume of the media output system to output media output information received from a security system (e.g., for high-priority security-related content). Block 630 may also, for example, comprise determining to present the media output information at a present volume setting (e.g., for medium or low priority content). Block 630 may additionally, for example, comprise ramping up the volume at which a high-priority message is being presented until acknowledged by a user.

Block 630 may also, for example, comprise determining to repeat outputting the output media information (e.g., a particular number of times, until a user acknowledges the output, etc.). For example, block 630 may comprise continually outputting a smoke detector alarm message until a user provides an input (e.g., a tactile input, a voice input, a smart phone input, etc.) indicating that the user has received the alarm. Also for example, block 630 may comprise outputting an appliance maintenance reminder each time a user enters a particular room until the user provides an input to reset the maintenance message and/or performs the correspondence maintenance.

In general, block 630 may comprise outputting the media output information received at block 610 to the media presentation zones and/or media devices identified at block 620. Accordingly, the scope of this disclosure should not be limited by characteristics of any particular manner of performing such outputting.

The example method 600 continues execution at block 695. The continued execution may comprise any of a variety of characteristics. For example, block 695 may comprise looping execution flow back up to any of the previous blocks of the example method 600 and/or to any flow diagram block discussed herein. For example, block 695 may comprise looping execution flow back up to block 610 for continued receipt of media output information, identification of media output zone(s) and/or media output devices, and outputting of the media output information.

As discussed herein, various aspects of this disclosure may comprise determining when to output media output information that is received from another system. An example of such operation is shown in FIG. 7.

Figure 7:
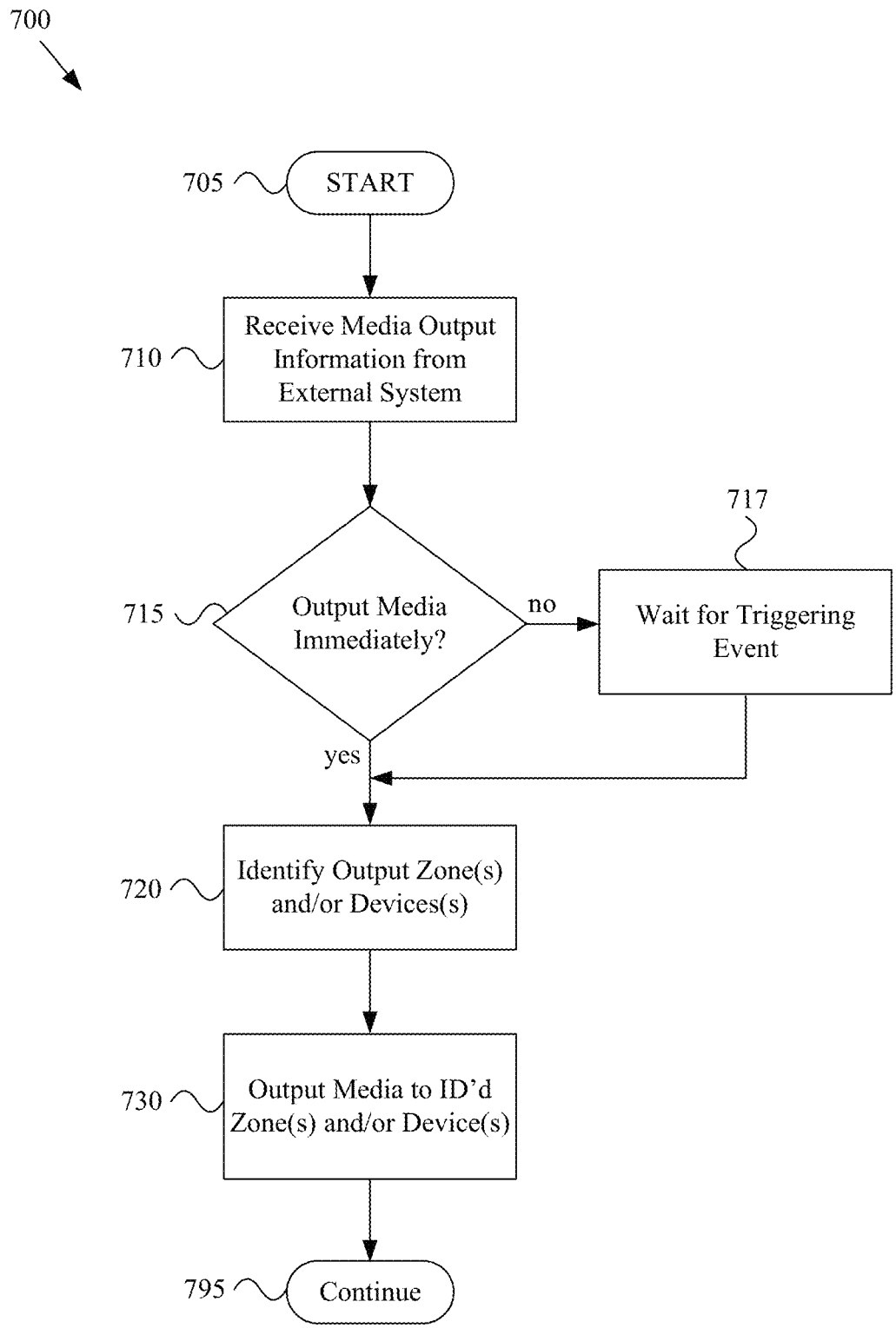
FIG. 7 is a flow diagram of an example method for integrating media output aspects of home systems, in accordance with various aspects of the present disclosure.

In particular, FIG. 7 is a flow diagram of an example method 700 for integrating media output aspects of home systems, in accordance with various aspects of the present disclosure. The example method 700 may, for example, share any or all characteristics with the other methods discussed herein (e.g., with regard to FIGS. 5, 6, and 8). For example, any or all blocks of the example method 700 may be integrated into any of such methods and vice versa. Additionally for example, the example method 700 may be implemented in any of the example environments shown in FIGS. 1-4 and/or presented in the discussions thereof.

The example method 700 and/or any portion thereof may, for example, be implemented by any of the systems presented herein (e.g., media system 201, security system 202, automation system 203, etc.) or any portion thereof (e.g., controller or other component). Though most of the examples discussed herein generally concern utilization of premises (or home) media system resources (e.g., sensor resources, media output resources, user input resources, etc.) with or by other systems, the scope of this disclosure applies as well to utilization of components of other systems by the home media system and/or to utilization of components of a first other system by a second other system.

The example method 700 begins executing at block 705. Block 705 may, for example, share any or all characteristics with block 605 of the example method 600 shown in FIG. 6 and discussed herein.

The example method 700 may, at block 710, comprise receiving media output information from an external system (e.g., an external premises or home security system, an external premises or home automation system, etc.). Block 710 may, for example, share any or all characteristics with block 610 of the example method 600 shown in FIG. 6 and discussed herein.

The received media output information may, for example, comprise information describing characteristics of the media output information. For example, the received media output information may, for example, comprise priority information characterizing the relative priority of the media output information. For example, an emergency message from a home security system may be associated with a relatively higher priority than a notification to a user from a home automation system that the water softener is running low on salt. Such priority information may, for example, be utilized at block 715 to determine whether the output information should be immediately output and/or utilized at block 720 to determine at which media output zones or devices to output the media.

Also for example, the received media output information may comprise information identifying one or more zones (e.g., areas in a home or premises) for which the media output information is relevant. Such zone information may, for example, be utilized at block 715 to determine whether the output information should be immediately output, and/or utilized at block 720 to determine at which media output zones or devices to output the media.

In general, block 710 may comprise receiving media output information from an external system. Accordingly, the scope of this disclosure should not be limited by characteristics of any particular type of media output information or of any particular manner of receiving such information.

The example method 700 may, for example at block 715 comprise determining whether to immediately output the media output information received at block 710. Block 715 may comprise determining whether to immediately output the media output information, or for example whether to delay outputting the media output information, in any of a variety of manners, non-limiting examples of which are presented herein.

For example, block 715 may comprise determining whether to immediately output the media output information based, at least in part, on priority of the media output information. For example, the media output information received at block 710 may be assigned a priority. Such a priority may, for example, be explicitly identified by a sender of the media output information (e.g., included with metadata information, packet header information, a field of packet payload information, etc.). For example, in a scenario in which the media output information is received at block 710 from a home security system, the received information may indicate that the media output information is high priority (e.g., for a smoke or fire alarm, for a high carbon monoxide reading, for an intruder alert, etc.) or a low priority (e.g., for a detected unlocked door or window, for a low but concerning carbon monoxide reading, etc.). In another example, a home automation system may indicate that the media output information is high priority (e.g., for a cooking timer, etc.) or a low priority (e.g., for a light left on in an empty room, for a window left open on a hot day, for an appliance service reminder, etc.).

Also for example, the priority may be assigned to the media output information based, at least in part, on the source of the information. For example, media output information received from a home security system may always be treated as high-priority media output information, and media output information received from a home automation system may always be treated as low-priority media output information.

In an example scenario, block 715 may comprise determining to immediately output a high-priority media output message, for example regardless of other media information (e.g., music, talk radio, etc.) that is being currently output. In other words, block 715 may comprise determining to interrupt media information that is already being output by the media system. In another example scenario, block 715 may determine to wait to present low-priority media output information until a present song, program, or segment is done. In other words, block 715 may determine that a song should not be interrupted for a notification that the water softener is low on salt or that it is time for routine maintenance on the air conditioner or that a window is unlocked.

Block 715 may also, for example, determine whether to immediately output received media output information based on user location. A system implementing the example method 700 or a portion thereof may, for example, track user location. Various examples of such tracking or user-locating operation are, for example, presented in U.S. application Ser. No. 14/725,904, filed May 29, 2015, titled "Multi-zone Media System and Method for Providing Multi-zone Media;" U.S. application Ser. No. 14/726,019, filed May 29, 2015, titled "System and Method for Providing User Location-based Multi-zone Media;" and U.S. application Ser. No. 14/726,109, filed May 29, 2015, titled "System and Method for Selecting and Providing Zone-Specific Media;" the contents of each of which are hereby incorporated herein by reference in their entirety. Note that any of such examples may, in accordance with various aspects of the present disclosure, utilize resources (e.g., sensors, control devices, etc.) of other systems instead of or in addition to resources of a media system.

For various received media output information, block 715 may comprise determining to delay presentation of the media output information until a user is present in an audio zone specifically associated with the received media output information. For example, in an example scenario in which the media output information is associated with a particular window being unlocked, block 715 may comprise determining to wait until a user (e.g., any user or a particular user) is within a particular distance of the window, or alternatively is the last user leaving a house, until outputting the media output information. In another example scenario in which the media output information is associated with an appliance in need of attention, block 715 may wait until a user is in an audio zone or area associated with the appliance. For example, in an example scenario in which an automobile is low on gas or in need of an oil change, block 715 may wait until a user enters the garage to output the media information.

For various received media output information, block 715 may comprise determining to delay presentation of the media output information until a user (or one or more identified relevant users) enters a premises or home. For example, block 715 may comprise determining to wait until a head of household is home before outputting home automation-related media output information received at block 710.

Additionally, for various received media output information, block 715 may comprise determining to delay presentation of the media output information until a particular time. For example, block 715 may comprise determining to present relatively low-priority media output information at regular timed intervals (e.g., at the top of every hour, at particular user-designated times of day, etc.). Also for example, block 715 may comprise determining to delay presentation of various received media output information until a user specifically requests such information (e.g., requests by touch input, requests by voice input, requests by smart phone input, etc.). In either of such examples, block 715 may comprise aggregating more than one media output for serial presentation thereof when the time comes.

If block 715 determines to immediately present the received media output information, flow of the example method 700 proceeds to block 720 for outputting the media information. If, however, block 715 determines to delay presentation of the media output information, flow of the example method 700 proceeds to block 717.

In general, block 715 comprises determining whether to immediately output the media output information received at block 710. Accordingly, the scope of this disclosure should not be limited by characteristics of any particular manner of performing such determining.

At block 717, the example method 700 may comprise waiting until one or more triggering events occur before directing execution flow of the method 700 to block 720 for outputting the media information. Block 717 may comprise performing such waiting in any of a variety of manners. For example, as discussed herein, block 717 may comprise waiting for media breaks in media currently being presented, waiting until a time, waiting until a user or particular user enters a zone, waiting until a user or particular user enters a home or premises, waiting until a user or last user leaves a home or premises, waiting until a user explicitly requests messages, etc. Accordingly, the scope of this disclosure should not be limited by characteristics of any particular triggering event(s) and/or of any particular manner of waiting for a triggering event.

The example method 700 may, at block 720, comprise identifying a media output zone and/or media output devices for outputting the media output information received at block 710. Block 720 may comprise performing such identifying in any of a variety of manners, non-limiting examples of which are presented herein. For example, block 720 may share any or all characteristics with block 620 of the example method 600 shown in FIG. 6 and discussed herein.

The example method 700 may, at block 730, comprise outputting the media output information received at block 710 to the media presentation zones and/or media devices identified at block 720. Block 730 may comprise performing such outputting in any of a variety of manners, non-limiting examples of which are presented herein. For example, block 730 may share any or all characteristics with block 630 of the example method 600 shown in FIG. 6 and discussed herein.

In addition to various systems sharing media output resources (e.g., a home media system sharing media output resources of the home media system with other systems), the various systems may also share media input and/or multi-way communication resources. Various non-limiting examples of such media output resource sharing are presented herein.

Figure 8:
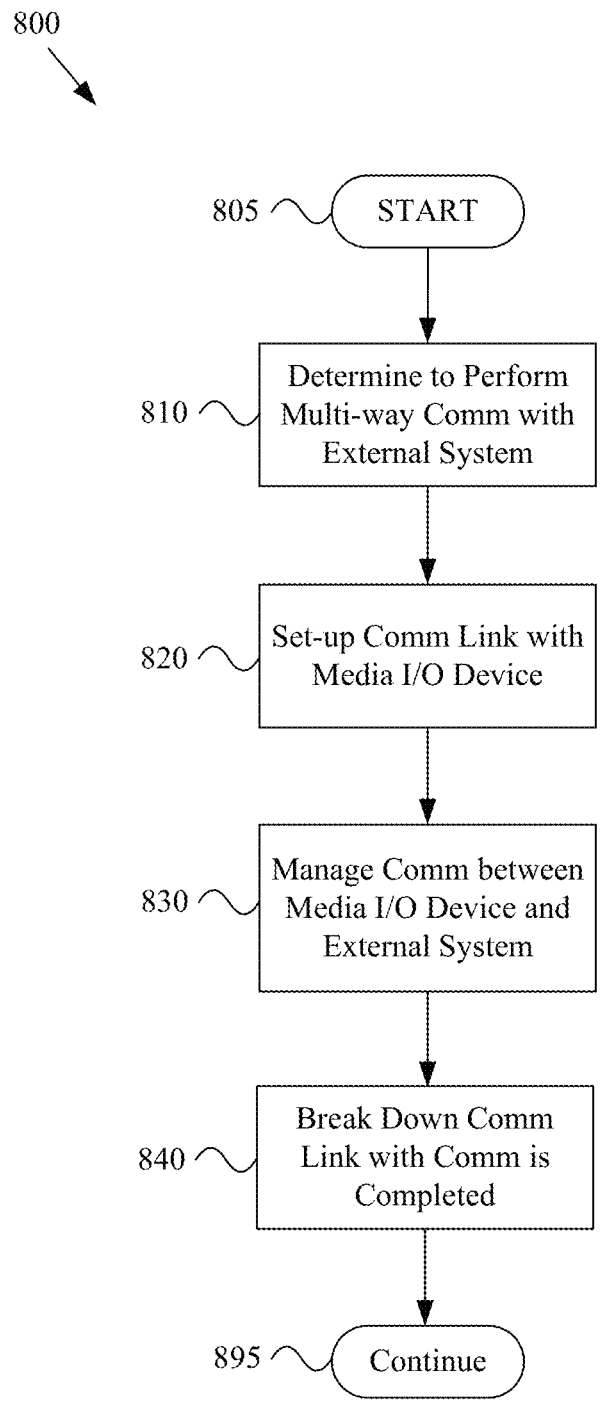
FIG. 8 is a flow diagram of an example method for integrating multi-way communication aspects of home systems, in accordance with various aspects of the present disclosure.

FIG. 8 is a flow diagram of an example method 800 for integrating multi-way communication aspects of home systems, in accordance with various aspects of the present disclosure.

The example method 800 may, for example, share any or all characteristics with the other methods discussed herein (e.g., with regard to FIGS. 5-7). For example, any or all blocks of the example method 800 may be integrated into any of such methods and vice versa. Additionally for example, the example method 800 may be implemented in any of the example environments shown in FIGS. 1-4 and/or presented in the discussions thereof.

The example method 800 and/or any portion thereof may, for example, be implemented by any of the systems presented herein (e.g., media system 201, security system 202, automation system 203, etc.) or any portion thereof (e.g., controller or other components). Though most of the examples discussed herein generally concern utilization of home media system resources (e.g., sensor resources, media output resources, user input resources, etc.) with or by other systems, the scope of this disclosure applies as well to utilization of components of other systems by the home media system and/or to utilization of components of a first other system by a second other system.

The example method 800 begins executing at block 805. The example method 800 may begin executing in response to any of a variety of causes or conditions. The method 800 may, for example, begin executing when a system implementing the method 800 is powered up, reset, or turned on. The method 800 may also, for example, begin executing when a system implementing the method 800 receives a command from a user to operate and/or operate with other systems (e.g., receiving a command directly at the system, receiving a command from a remote controller, receiving a command from a user's smart phone, etc.). The method 800 may further, for example, begin executing in response to a system or component thereof (e.g., a controller, device, etc.) exiting from a sleep mode. The method 800 may also, for example, begin executing in response to a system implementing the method 800 receiving a message from another system, for example a message regarding resource sharing (e.g., regarding utilization of one or more input and/or output devices of the media system to perform a multi-way communication). Still further for example, block 805 may receive execution flow from any of the blocks of the example method 800 and/or from any flow diagram block discussed herein (e.g., at FIGS. 5-7). In general, the method 800 may begin executing in response to any of a variety of causes or conditions. Accordingly, the scope of this disclosure should not be limited by characteristics of any particular initiating cause or condition.

The example method 800 may, at block 810, comprise determining to perform multi-way (e.g., two-way, etc.) communication with an external system (e.g., with a system different from the system implementing the method 800). Block 810 may be performed by any of a variety of system components. For example, Block 810 may be performed by a controller of a media system (e.g., the media controller 111) and/or a device of the media system other than a controller (e.g., any of the devices of the media system 201 shown in FIGS. 1-4, for example media output devices, media input devices, sensor devices, control devices, etc.). Block 810 may comprise determining to perform a multi-way communication in any of a variety of manners, non-limiting examples of which are presented herein.

Block 810 may, for example, comprise determining to perform multi-way communication (e.g., acting as an intermediary between a user and an external system) based, at least in part, on receiving a message requesting multi-way communication. For example, block 810 may comprise a media controller (e.g., the media controller 111) receiving a message from another system (e.g., the security system 202, the automation system 203, etc.) or component thereof requesting assistance from one or more components in the media system 201 in conducting multi-way communication with a user. In an example scenario, block 810 may comprise the media system controller 111 receiving a message from the security system controller 211 requesting that the media system controller 111 or other media system device provide multi-way communication between a user and the security system 202. Based at least in part on such a received message, the media system controller 111 may determine to perform the multi-way user communication. In another example scenario, the loudspeaker 171 may receive a message from the automation system controller 311 requesting that the loudspeaker 171 (e.g., in conjunction with an on-board microphone and/or loudspeaker that can operate as a microphone) perform multi-way user communication. Based at least in part on such a received message, the loudspeaker 171 may determine to perform the requested multi-way user communication.

Block 810 may also, for example, comprise determining to perform a multi-way communication between a user and an external system based, at least in part, on a user input. For example, a user of the media system 201 may provide an input at the media controller 111 or other device of the media system 201 (e.g., a loudspeaker, monitor, etc.) requesting multi-way communication between the user and a system external to the media system 201 (e.g., the home security system 202, home automation system 203, etc.). The input may, for example, comprise a tactile input, a voice input, a smart phone input, a loud noise, etc.

Block 810 may additionally, for example, comprise determining to perform multi-way communication continually (e.g., whenever a system implementing the method 800 and a system external to the system implementing the method 800 are operating). For example, in an example scenario, audio received in a microphone of a home media system 201 may be provided to a home automation system 203 for processing by the home automation system 203 (e.g., to detect user commands to the home automation system 203).

Block 810 may further, for example, comprise determining to perform multi-way communication whenever a system implementing the method 800 is providing output media information to a user (e.g., when operating in conjunction with the example methods 600 and 700 shown in FIGS. 6 and 7, and discussed herein). For example, in an example scenario in which a home media system provides media output to a user on behalf of another system (e.g., on behalf of a home security system, home automation system, etc.), block 810 may determine to perform multi-way communication in anticipation of a user response to such media output.

In general, block 810 may comprise determining to perform multi-way communication with an external system (e.g., on behalf of a user). Accordingly, the scope of this disclosure should not be limited by characteristics of any particular manner of performing such determining.

The example method 800 may, at block 820, comprise setting up communication links to perform the multi-way communication. For example, block 820 may be performed, at least in part, by a controller of a media system (e.g., the media controller 111) and/or a device of the media system other than a controller (e.g., any of the devices of the media system 201 shown in FIGS. 1-4, for example media output devices, media input devices, sensor devices, control devices, etc.). Similarly, block 820 may be performed, at least in part, by an external system component (e.g., a security system controller 211, automation system controller 311, etc.), for example cooperating in the establishment of one or more communication links. Block 820 may comprise setting up the multi-way communication links in any of a variety of manners, non-limiting examples of which are presented herein.

Block 820 may, for example, comprise allocating the communication resources needed to perform the multi-way communication (e.g., channel resources, timeslots, codes, frequencies, etc.). Such allocation might not always be necessary, but may be necessary depending on the present state of the communication environment. For example, in an example scenario in which a first communication link has already been established between a media controller implementing block 820 (or a portion thereof) and the external system with which the multi-way user communication is to be performed, and in which a second communication link between the media controller and the relevant media device (e.g., a loudspeaker device with audio input and output capability) has already been established, block 820 may comprise setting up full or half duplex communication on the first and/or second communication links.

Also for example, in an example scenario in which a first duplex communication link has already been established between a media controller implementing block 820 (or a portion thereof) and the external system with which the multi-way user communication is to be performed, and in which a communication link capable of handling multi-way communication information has not yet been established (e.g., a two-way data channel) between the media controller and the relevant media device, block 820 may comprise the media controller communicating with the media device over a common control channel to establish the necessary multi-way communication link.

Additionally for example, in an example scenario in which a direct multi-way communication link between the external system and the media device is to be utilized, block 820 may comprise establishing a multi-way communication between the external system and the media device that bypasses the media controller. FIG. 4, for example, shows an example communication environment in which such a communication link may be established. In an example scenario, a media controller need not even participate in implementing the method 800, which may for example be implemented by a media device (e.g., an intelligent loudspeaker communicating directly with the external system, or a controller or other component thereof).

Note that the communication link utilized for multi-way communication between the external system and a media device of the media system may be completely independent of communication links typically utilized between the media controller and the media device for the communication of general media information. For example, there may be a first communication link between the media controller and the media device that is utilized generally for the communication of media system information with the media device, and a second communication link independent of the first communication link for the communication of multi-way communication information between the media device and the system external to the media system. In such an implementation, the quality of the first communication link, which might have hi-fidelity constraints, may be substantially greater than the quality of the second communication link, which might for example have a quality level more on the order of a telephony system.

In general, block 820 may comprise setting up communication links to perform the multi-way communication. Accordingly, the scope of this disclosure should not be limited by characteristics of any particular manner of setting up (or establishing) such communication links.

The example method 800 may, at block 830, comprise managing the multi-way communication (e.g., user communication) between the external system and the media device (s). For example, Block 830 may be performed by a controller of a media system (e.g., the media controller 111) and/or a device of the media system other than a controller (e.g., any of the devices of the media system 201 shown in FIGS. 1-4, for example media output devices, media input devices, sensor devices, control devices, etc.). Block 830 may comprise performing such communication management in any of a variety of manners, non-limiting examples of which are discussed herein.

For example, in an example scenario in which a media controller (e.g., the media controller 111) functions as a conduit for communication between the media system and systems external to the media system, the media controller may for example operate as a router for communications between the external systems and the media devices (e.g., loudspeakers) or components thereof. For example, in an example scenario the media controller 111 may receive a user output communication from the automation system controller 311 via the communication network 205, and then direct the user output communication to the relevant media device(s) of the media network 201. For example, the media controller 111 and automation system controller 311 may communicate information with each other utilizing each other's respective address on the communication network 205. Continuing the example scenario, the media controller 111 may then receive a user input communication from the media device(s), and then direct the user input communication back to the automation system controller 311.

In another example scenario, the security system controller 211 communicates to a media device of the media system 201 through the communication network 205 without communicating via the media controller 111. In such an example scenario, the media device and the security system controller 211 may communicate utilizing each other's respective address on the communication network 205.

Since communication information may be represented utilizing any of a variety of coding techniques, there may be scenarios in which a recipient of multi-way communication information and/or an intermediate device may transcode the information. For example, in an example scenario, the security system 202 may communicate user audio output information to the media system 201 in a first encoding format, first packet format, etc. In such a scenario, the media system controller 111 may receive the audio information from the security system controller 211 and transpose the audio output information to an encoding and/or packet format that is utilized by the relevant media device(s) of the media system 201. The media system controller 111 may then communicate the transcoded audio information to the relevant media device(s) (e.g., to one or more selected loudspeakers for the output communication to the user). Similarly, for the return path, the media system controller 111 may receive user input information from a media device that is encoded and/or packetized in a media system format, transcode the user input information into a security system format, and then forward the transcoded user input information back to the security system controller 211 via the communication network 205.

In another example scenario in which the external system (e.g., a controller thereof) and the media device of the media system communicate directly with each other, for example without an intervening media system controller, the media device and/or the external system may perform any necessary transcoding.

In general, block 830 comprises managing the multi-way communication between the external system and the media device(s). Accordingly, the scope of this disclosure should not be limited by any particular manner of managing such communication.

The example method 800 may, for example at block 840, comprise breaking down the communication link(s) established at block 820 when the multi-way communication performed at block 830 is complete. Block 840 may comprise such communication link break-down in any of a variety of manners, non-limiting examples of which are presented herein. For example, block 840 may comprise releasing communication resources (e.g., communication bandwidth, channels, timeslots, frequencies, codes, etc.) allocated for the communication link(s) at block 820. In general, block 840 comprises breaking down the communication link(s) established at block 820. Accordingly, the scope of various aspects of this disclosure should not be limited by any particular manner of breaking down (or de-allocating resources of) a communication link.

The example method 800 continues execution at block 895. The continued execution may comprise any of a variety of characteristics. For example, block 895 may comprise looping execution flow of the example method 800 back up to any of the previous blocks of the example method 800 and/or to any flow diagram block discussed herein. For example, block 895 may comprises looping execution flow of the example method 800 back up to block 810 for continued communication determination, set-up, management, and tear-down. Note that multi-way communication, for example utilizing user communication resources of the media system to conduct two-way user communication with systems external to the media system, may be performed in conjunction with any of the other methods discussed herein, for example, with security system operation, automation system operation, etc.

Figure 9:
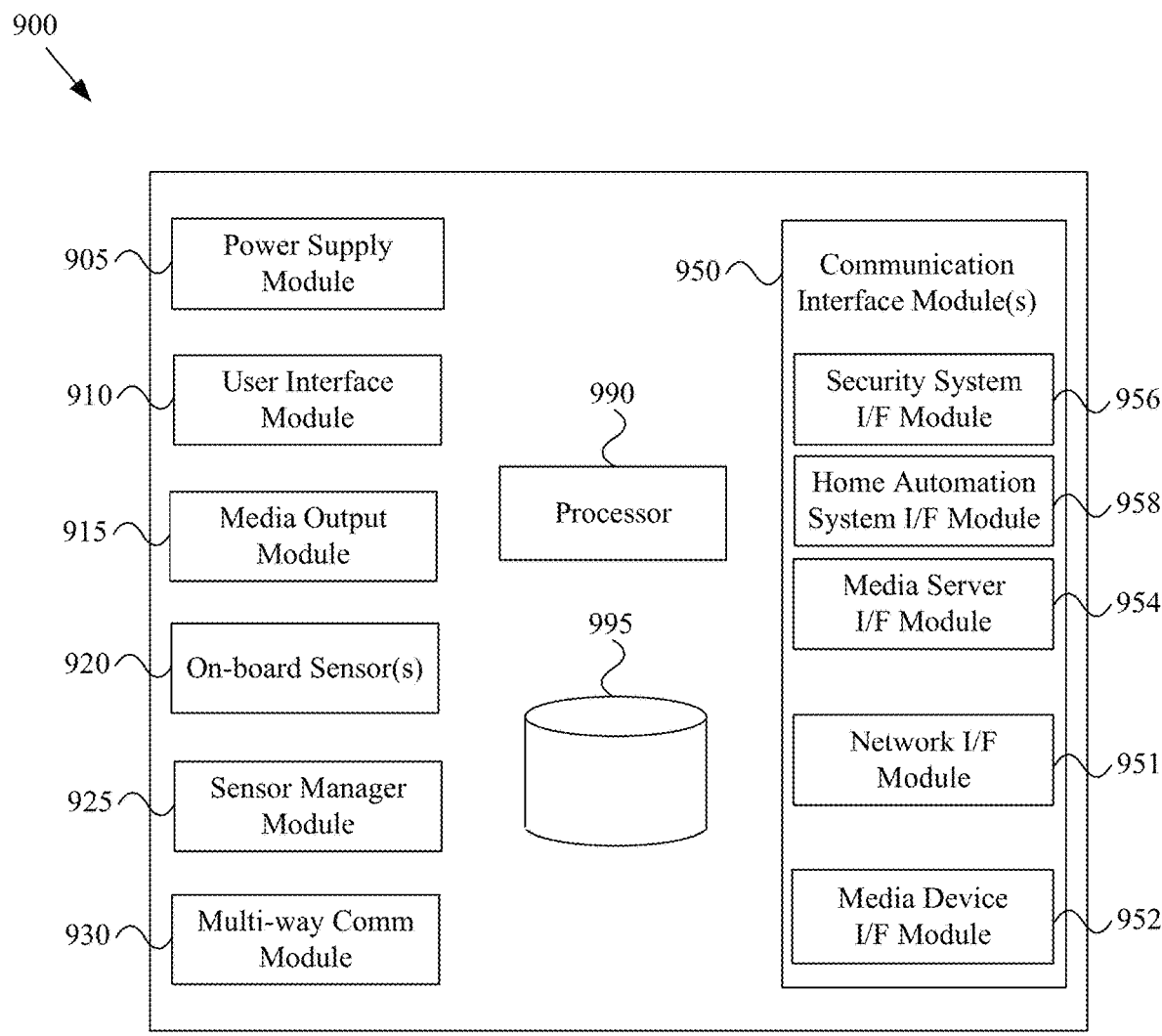
FIG. 9 is a block diagram of an example media system component, in accordance with various aspects of the present disclosure.

As explained herein, the example methods 500, 600, 700, and 800 presented herein, or any portion thereof, may be performed by one or more media system resources (e.g., a premises or home media controller). FIG. 9 provides a non-limiting example of a media system controller that may implement any of the example methods presented herein or any portion thereof.

FIG. 9 is a block diagram of an example media system component (e.g., a media system controller and/or other components), in accordance with various aspects of the present disclosure. The example media system component 900 may, for example, operate to or be operable to perform any or all of the functionality discussed herein (e.g., with regard to the example methods 500, 600, 700, and 800 illustrated in FIGS. 5-8 and discussed herein, with regard to the example environments 100, 200, 300, and 400 illustrated in FIGS. 1-4 and discussed herein, with regard to the methods and systems incorporated herein by reference, etc.). The media system component 900 may, for example, comprise any one or more of a variety of media system components. For example, the media system component 900 may comprise a home or premises media controller, a loudspeaker, a video display, etc., but the scope of this disclosure is not limited thereto. The media system component 900 may, for example, share any or all characteristics with the media controller 111 and/or other components of the media system 201 discussed herein.

The media system component 900 may, for example, comprise a power supply module 905. The power supply module 905 may, for example, comprise electrical circuitry operable to receive and/or prepare electrical power for utilization by the other modules of the media system component 900. The power supply module 905 may, for example, comprise an A/C power module adapted for plugging into a premises power outlet and/or for direct integration into the A/C power system of a premises (e.g., a home, campus, outdoor area associated therewith, etc.). The power supply module 905 may also, for example, be operable to receive and/or prepare electrical power from a power-over-Ethernet (POE) system. The power supply module 905 may additionally, for example, be operable to receive and/or prepare battery power (e.g., manage battery operation for power supply, recharging, etc.). The power supply module 905 may also, for example, be operable to provide electrical power (e.g., via Ethernet or other wiring) to other media devices (e.g., to other loudspeakers), sensors, controllers, etc.

The example media system component 900 may also, for example, comprise a user interface module 910. The user interface module 910 may, for example, be operable to perform any or all of the user interface functionality discussed herein. For example, the user interface module 910 may be operable to perform the user and/or output functionality discussed herein with regard to at least the example method 500 illustrated in FIG. 5, the example method 600 illustrated in FIG. 6, the example method 700 illustrated in FIG. 7, and the example method 800 illustrated in FIG. 8.

For example, the user interface module 910 may comprise or manage any one or more of a variety of sensors for user input. For example, the user interface module 910 may comprise a touch sensor and associated circuitry for processing touch inputs. The touch sensor for user touch input may, for example, comprise a touch pad, touch screen, heat sensor, capacitive sensor, piezo-resistive sensor, piezo-electric sensor, light sensor, MEMS inertial sensor, a mechanical switch, etc. The touch input may, for example, comprise a tap input (e.g., single-tap, double-tap, n-tap, etc.). The touch input may, for example, comprise a touch input on a graphical user interface feature being presented to the user on a touch screen. The touch input may also, for example, comprise a swipe input (e.g., for adjustment of media presentation characteristics, like volume, etc.). Also for example, the user interface module 910 may comprise a microphone sensor and associated circuitry for processing audible inputs (e.g., voice commands).

The user input sensors may, for example, be included on or within an enclosure of the media system component 900 (e.g., in a single or multiple enclosure system). Additionally for example, the sensors may be physically separate from and/or outside of an enclosure of the media system component 900. As discussed herein, for example, touch sensors and/or microphones may be incorporated into switch plates, door frames, doors, etc., and thus need not necessarily be physically integrated with the media system component 900 or any portion thereof. In such example implementations, the sensors may be hardwired with the media system component 900 and/or may wirelessly communicate with the media system component 900. In a wireless communication scenario, the user interface module 910 may utilize wireless communication capability of the communication interface module 950 discussed herein to communicate wirelessly with one or more sensors.

The user interface module 910 may also, for example, comprise any one or more of a variety of user output devices (e.g., for providing audio and/or video media to a user, for providing audio feedback to a user, for providing visual output feedback to a user, etc.). For example, the user interface module 910 may operate to provide an output to the user to indicate the mode of operation in which the media system component 900 is operating, to indicate a source of the media output being presented to the user, to indicate the media output characteristics of the media currently being presented to the user, to output user input features (e.g., graphical user interface features), etc.

The user interface module 910 may further, for example, operate to interface with a remote control device (e.g., a dedicated remote control device, a smart phone, etc.). For example, the user interface module 910 may utilize the communication interface module 950 to communicate with the user's smart phone.

The example media system component 900 may additionally, for example, comprise one or more communication interface modules 950. The communication interface module(s) 950 may, for example, be operable to perform any or all of the communication functionality discussed herein (e.g., in the discussions of FIGS. 1-8). Such communication functionality may, for example, comprise communicating with other systems or devices (e.g., other loudspeakers or displays, controllers, media servers, etc.). Such communication functionality may, for example, comprise communicating information regarding general system operation, media information, sensor information, security information, home automation information, user input and/or output information, zone identification information, user identification information, media content, etc.

The communication interface module(s) 950 (e.g., a media device interface module 952) may, for example, be operable to establish, maintain, and utilize communication links with other media devices (e.g., with loudspeakers, with video monitors, with a media controller, with a local media server within a premises or home over a local area network, with a remote media server outside of a premises or home over the Internet, cable, landline and/or other networks, with remote control devices, smart phones, smart watches, etc.). The communication interface module 950 may, for example, be operable to communicate over wired, wireless, or optical links.

The communication interface module(s) 950 (e.g., a network interface module 951) may, for example, be operable to interface with a wired and/or wireless local area network (LAN), personal area network (PAN), wide area network (WAN), etc. The communication interface module(s) 950 may, for example, be operable to interface with a telecommunication network (e.g., cellular, landline, satellite, etc.), a television network (e.g., cable, satellite, etc.), etc. The communication interface module(s) 950 may, for example, be operable to communicate utilizing any of a variety of standard and/or proprietary communication protocols (e.g., Wi-Fi, Ethernet, Bluetooth, near field, 4G, 5G, LTE, MoCA, 802.15, etc.).

The communication interface module(s) 950 (e.g., a security system interface module 956) may, for example, be operable to communicate with a security system (e.g., a home security system). For example, in the various example implementations discussed herein, the communication interface module(s) 950 of the media system controller 111 may be operable to communicate with the security system controller 211. For example, the security system interface module 956 may be operable to perform any or all of the communication functionality discussed herein with regard to the media system 201 (e.g., the media system controller 111, or other devices of the media system 201) communicating with the security system 202 (e.g., the security system controller 211, or other devices of the security system 202). In an example implementation, the security system interface module 956 may comprise performing security system application layer protocol functionality on top of lower layer communication protocol functionality provided by the network interface module 951.

The communication interface module(s) 950 (e.g., a home automation system interface module 958) may, for example, be operable to communicate with an automation system (e.g., a home automation system). For example, in the various example implementations discussed herein, the communication interface module(s) 950 of the media system controller 111 may be operable to communicate with the home automation system controller 311. For example, the home automation system interface module 958 may be operable to perform any or all of the communication functionality discussed herein with regard to the media system 201 (e.g., the media system controller 111, or other devices of the media system 201) communicating with the automation system 203 (e.g., the automation system controller 311, or other devices of the automation system 203). In an example implementation, the automation system interface module 958 may comprise performing automation system application layer protocol functionality on top of lower layer communication protocol functionality provided by the network interface module 951.

The communication interface module(s) 950 (e.g., a media server interface module 954) may, for example, be operable to communicate with a media server system (e.g., a local home media server system, a remote media server system remote from the home, etc.). For example, in the various example implementations discussed herein, the communication interface module(s) 950 of the media system controller 111 may be operable to communicate with various media servers, for the general presentation of audio and/or video media to a user. For example, the media server interface module 954 may be operable to perform any or all of the communication functionality discussed herein with regard to the media system 201 (e.g., the media system controller 111, or other devices of the media system 201) communicating with a media server (e.g., a local home media server system, a remote media server system remote from the home, etc.). In an example implementation, the media server interface module 954 may be operable to perform media server application layer protocol functionality on top of lower layer communication protocol functionality provided by the network interface module 951.

The example media system component 900 may additionally, for example, comprise a media output module 915. The media output module 915 may, for example, be operable to perform any or all of the media output functionality discussed herein (e.g., with regard to the example methods 600 and 700 shown in FIGS. 6-7 and discussed herein; with regard to other methods 500 and 800 shown in FIGS. 5 and 8 and discussed herein; with regard to the example environments 100, 200, 300, and 400 shown in FIGS. 1-4 and discussed herein, with regard to the example methods and/or systems incorporated herein by reference, etc.). Such media output functionality may, for example, comprise generally performing media output functionality for the media system (e.g., performing general audio and/or video outputting, for example for audio and/or video streaming, outputting media from local home-based or remote media servers, etc.). Also for example, as discussed herein, at least a portion of the media output functionality may, for example, comprise outputting media received from other systems different from the media system (e.g., media received at a home media system from a home or premises security system, media received from a home or premises automation system, etc.).

The example media system component 900 may further, for example, comprise one or more on-board sensors 920. Various examples of such sensors, for example with regard to user I/O, were discussed herein with regard to the user interface module 910. Many examples of the on-board sensors 920 are presented herein. For example, the on-board sensors 920 may comprise a motion detector, light detector, gas sensor, microphone, vibration sensor, infrared sensor, camera, scale, static sensor, touch pad, retinal scanner, fingerprint sensor, biometric detector, etc. The on-board sensors 920 may, for example, be attached to and/or incorporated within a housing of the media component 900. Also, as discussed herein, in addition to the on-board sensors 920, the media component 900 may also comprise sensors that are off-board the component 900 (e.g., not attached to and/or incorporated within a housing of the component 900) but which are communicatively coupled to the component 900.

The example media system component 900 may, for example, comprise a sensor manager module 925. The sensor manager module 925 may, for example, be operable perform any or all of the sensor-related functionality discussed herein (e.g., with regard to the example method 500 shown in FIG. 5 and discussed herein; with regard to other methods 600, 700, and 800 shown in FIGS. 6-8 and discussed herein; with regard to the example environments 100, 200, 300, and 400 shown in FIG. 1-4 and discussed herein; with regard to the example methods and/or systems incorporated herein by reference, etc.).

For example, the sensor manager module 925 may be operable to interface with on-board sensors 920 and/or with off-board sensors (e.g., sensors that are not attached to and/or located with a housing of the media system component 900). For example, when a reading from a sensor is desired, the sensor manager module 925 may interface with the sensor to acquire the desired reading. Also for example, in another example scenario, the sensor manager module 925 may operate to asynchronously receive sensor measurement information from a sensor (e.g., on an interrupt basis).

The sensor manager module 925 may, for example, be operable to interface with systems external to the media system (e.g., home security systems, home automation systems, etc.). For example, in an example scenario, the sensor manager module 925 of the media controller 111 may be operable to utilize the security system I/F module 956 to communicate with the security system 202 (e.g., the security system controller 211) via the communication network 205. In such an example scenario, the sensor manager module 925 may, for example, be operable to interface with the security system 202 at the application level (e.g., operating in accordance with an application layer communication protocol that is also understood and utilized by the security system 202). Also for example, in an example scenario, the sensor manager module 925 of the media controller 111 may be operable to utilize the home automation system I/F module 958 to communicate with the automation system 203 (e.g., the automation system controller 311) via the network 205. In such an example scenario, the sensor manager module 925 may, for example, be operable to interface with the automation system 203 at the application level (e.g., operating in accordance with an application layer communication protocol that is also understood and utilized by the automation system 203).

Note that the sensor manager module 925 may also be operable to interface with sensors of systems external to the media system of the media system component 900. For example, the sensor manager module 925 may utilize the security system interface module 956 to communicate with a sensor of a home security system (e.g., any of the sensors 220, 240, and 250 of the home security system 202), either via a controller of the security system (e.g., the home security system controller 211) or directly via the communication network 205 and by-passing the security system controller. Similarly, the sensor manager module 925 may utilize the home automation system interface module 958 to communicate with a sensor of a home automation system (e.g., any of the sensors or controllers 310 and 320 of the home automation system 203), either via a controller of the home automation system (e.g., the home automation system controller 311) or directly via the communication network 205 and by-passing the home automation system controller.

The example media system component 900 may, for example, comprise a multi-way communication module 930. The multi-way (e.g., two-way, three-way, etc.) communication module 930 may, for example, be operable to perform any or all of the multi-way communication functionality discussed herein (e.g., with regard to the example method 800 shown in FIG. 8 and discussed herein; with regard to the example methods 600 and 700 shown in FIGS. 6 and 7 and discussed herein; with regard to other methods discussed herein, with regard to the example environments 100, 200, 300, and 400 shown in FIGS. 1-4 and discussed herein; with regard to the example methods and systems incorporated herein by reference, etc.).

For example, the multi-way communication module 930 may be operable to communicate with input and/or output devices of (e.g., on-board) the media system component 900. For example, in an example scenario in which the multi-way communication module 930 is managing a two-way communication between a user of the media system component 900 of a home media system 201 and a home automation system 203, the multi-way communication module 930 may operate to communicate audio output media to a speaker of the media system component 900 and receive audio input media from a microphone of the media system component 900.

Also for example, the multi-way communication module 930 may be operable to communicate with input and/or output devices that are off-board yet communicatively coupled to the media system component 900. For example, in the example environments shown in FIGS. 1-4, the multi-way communication module 930 of the media system controller 111 may utilize the media device interface module 952 to communicate with the other media devices of the media system 201. In an example scenario, the media system controller 111 may utilize the media device interface module 952 to communicate with a media device 133 that has audio input and output capability to output audio information to a user (e.g., through a loudspeaker) and receive input audio input from the user (e.g., through a microphone, through a loudspeaker being utilized as a microphone, etc.).

Further for example, the multi-way communication module 930 may, for example, be operable to interface with systems external to the media system (e.g., home security systems, home automation systems, etc.). For example, in an example scenario, the multi-way communication module 930 of the media controller 111 may be operable to utilize the security system I/F module 956 to communicate in a bi-directional manner with the security system 202 (e.g., the security system controller 211) via the network 205. In such an example scenario, the multi-way communication module 930 may, for example, be operable to interface with the security system 202 at the application level (e.g., operating in accordance with an application layer communication protocol that is also understood and utilized by the security system 202). Also for example, in an example scenario, the multi-way communication module 930 of the media controller 111 may be operable to utilize the home automation system I/F module 958 to communicate in a bi-directional manner with the automation system 203 (e.g., the automation system controller 311) via the communication network 205. In such an example scenario, the multi-way communication module 930 may, for example, be operable to interface with the automation system 203 at the application level (e.g., operating in accordance with an application layer communication protocol that is also understood and utilized by the automation system 203).

In an example scenario, the multi-way communication module 930 may operate to receive audio output information from the security system 202 via the communication network 205 and the security system interface module 956. The multi-way communication module 930 may operate to utilize the media device interface module 952 to communicate the received audio output information to any or all of the media devices of the media system 201 that have audio output capability. The multi-way communication module 930 may then operate to receive user input information (e.g., from a user responding to the audio output) via the media device interface module 952 from any of the media devices of the media system 201 that have user input capability (e.g., touch input capability, audio input capability, smart phone input capability, etc.), and utilize the home automation system interface module 958 to communicate the received user input information to the home automation system 203 via the communication network 205.

In another example scenario, the multi-way communication module 930 may operate to receive a user audio command via the media device interface module 952 from a media device of the media system 201 to change a temperature. The multi-way communication module 930 may then operate to forward the temperature change command to the home automation system controller 311 via the home automation system interface module 958 and the communication network 205. The multi-way communication module 930 may then operate to receive an acknowledgement message from the home automation system 203 via the communication network 205 and the home automation system interface module 958, and utilize the media device interface module 952 to output the acknowledgement message to the user.

The example media component 900 may, for example, comprise a processor 990 (e.g., at least one) and a memory 995 (e.g., at least one). Any or all of the functionality or associated modules discussed herein may, for example, be implemented in hardware and/or implemented using a combination of hardware and software (e.g., a processor operating in accordance with software instructions stored on a non-transitory computer-readable medium). For example, the processor 990 may operate in accordance with software instructions stored in the memory 995 to implement all or any part of the modules discussed herein. The processor 990 may, for example, comprise one or more of a general-purpose microprocessor, a digital signal processor (DSP), an application specific integrated circuit (ASIC), a microcontroller, etc. The memory 995 may, for example, comprise one or more of a non-volatile and/or volatile memory. Note that the memory 995 may also be utilized for storing media content, media presentation characteristics, user profile information, etc.

Though the example media system component 900 is generally discussed herein by example as a media system controller, the scope of this disclosure should not be limited by characteristics of such media system controller example. For example, the component 900 may also be implemented as a component of a system external to a media system. For example, the component 900 or any portion thereof may be implemented as a security system component (e.g., a home security system controller 211, etc.), an automation system component (e.g., a home automation system controller 311, etc.), and/or any of a variety of other types of system components.

Figure 10:
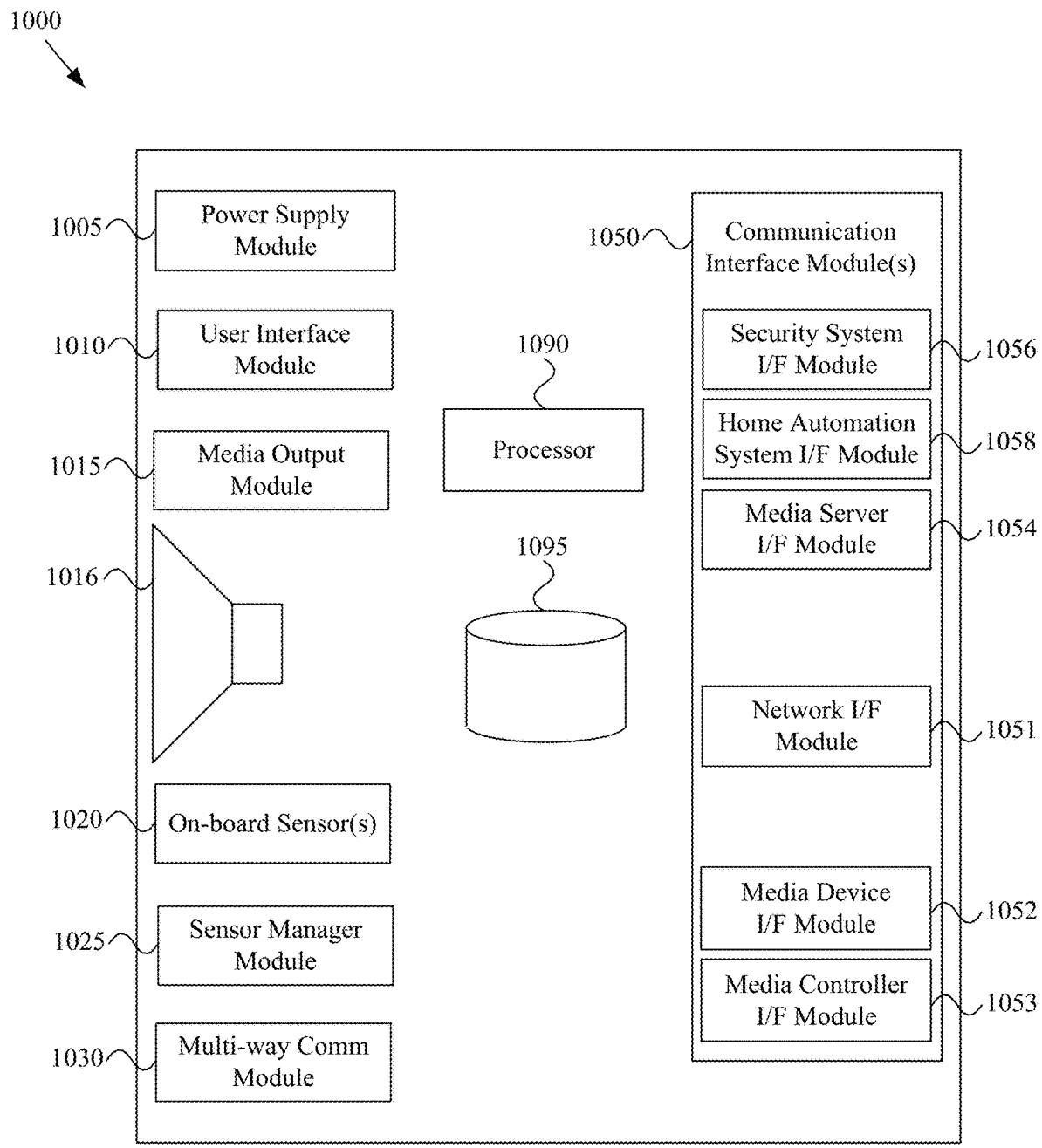
FIG. 10 is a block diagram of an example media system component, in accordance with various aspects of the present disclosure.

Another example of a media system component (e.g., a media system device) that is operable in accordance with various aspects of this disclosure is shown in FIG. 10. More particularly, FIG. 10 is a block diagram of an example media system component 1000, in accordance with various aspects of the present disclosure. The media system component 1000 may, for example, share any or all characteristics with the example component 900 shown in FIG. 9 and discussed herein. The media system component 1000 may, for example, comprise a media device, for example with media input capability, user input capability, sensor operation capability, etc. For example, the media system component 1000 may comprise a loudspeaker component, a video monitor component, etc. The following discussion will generally refer to the media system component 1000 as a media device.

The example media device 1000 may, for example, operate to or be operable to perform any or all of the functionality discussed herein (e.g., with regard to the example methods 500, 600, 700, and 800 illustrated in FIGS. 5-8 and discussed herein, and with regard to the example environments 100, 200, 300, and 400 illustrated in FIGS. 1-4 and discussed herein, with regard to the methods and systems incorporated herein by reference, etc.). The media device 1000 may, for example, comprise any one or more of a variety of media system components. For example, the media device may comprise a loudspeaker, a video display, a home or premises media controller, etc., but the scope of this disclosure is not limited thereto. The media device 1000 may, for example, share any or all characteristics with the media devices 112, 113, 114, 115 and 215, 121, 122, 131 and 331, 132, 133 and 233, 141 and 341, 151 and 351, 161 and 261 and 361, 171 and 271 and 371, home media system controller 111, etc.

The media device 1000 may, for example, comprise a power supply module 1005. The power supply module 905 may, for example, share any or all characteristics with the power supply module 905 shown in FIG. 9 and discussed herein.

The example media device 1000 may also, for example, comprise a user interface module 1010. The user interface module 1010 may, for example, share any or all characteristics with the user interface module 910 of FIG. 9 and discussed herein.

The example media system component 1000 may additionally, for example, comprise one or more communication interface modules 1050. The communication interface module(s) 1050 (e.g., the security system interface module 1056, home automation system interface module 1058, media server interface module 1054, network interface module 1051, media device interface module 1052, etc.) may share any or all characteristics with the communication interface module(s) 950 of the media system component 900 illustrated in FIG. 9 and discussed herein (e.g., with the security system interface module 956, home automation system interface module 958, media server interface module 954, network interface module 951, and media device interface module 952, respectively).

The communication interface module(s) 1050 (e.g., a media controller interface module 953) may, for example, be operable to establish, maintain, and utilize communication links with a media system controller (e.g., a home media system controller 111 as discussed herein or any media system controller). Note that other communication interface modules (e.g., the security system interface module 1056, the home automation system interface module 1058, the media server interface module 1054, the network interface module 1051, etc.) may communicate via a communication network directly with their target devices, but may also utilize the media controller interface module 1053 to communicate with such target devices via a media controller. For example, in an example scenario, the security system interface module 1056 of media device 132 may communicate directly with the security system controller 211 via the communication network 205, but may also utilize the media controller interface module 1053 to communicate with the security system controller 211 via the home media system controller 111 and the communication network 205.

The example media device 1000 may, for example, comprise one or more media output devices 1016 (e.g., an on-board speaker, video display, etc.). Such media output devices 1016 may, for example, be on-board the media device 1000 (e.g., attached to and/or within a housing of the media device 1000) or may be off-board the media device 1000 and communicatively coupled thereto (e.g., communicatively coupled to the media device 1000 via the media device interface module 1052). Various modules of the media device 1000 (e.g., the media output module 1015, multi-way communication module 1030, etc.) may utilize the media output device 1016 to output media.

The example media device 1000 may further, for example, comprise one or more on-board sensors 1020. The on-board sensor(s) 1020 may, for example, share any or all characteristics with the example on-board sensor(s) 920 of FIG. 9 and discussed herein. Many examples of the on-board sensors 1020 are presented herein. For example, the on-board sensors 1020 may comprise a motion detector, light detector, gas sensor, microphone, vibration sensor, infrared sensor, camera, scale, static sensor, touch pad, retinal scanner, fingerprint sensor, biometric detector, etc. The on-board sensors 1020 may, for example, be attached to and/or incorporated within a housing of the media device 1000. Also, as discussed herein, in addition to the on-board sensors 1020, the media device 1000 may also comprise sensors that are off-board the device 1000 (e.g., not attached to and/or incorporated within a housing of the device 1000) but which are communicatively coupled to the device 1000.

The example media device 1000 may, for example, comprise a sensor manager module 1025. The sensor manager module 1025 may, for example, share any or all characteristics with the sensor manager module 925 or the example media component 900 shown in FIG. 9 and discussed herein The example media device 1000 may, for example, comprise a multi-way communication module 1030. The multi-way (e.g., two-way, three-way, etc.) communication module 1030 may, for example, share any or all characteristics with the multi-way communication module 930 of the example media component 900 shown in FIG. 9 and discussed herein.

The example media device 1000 may, for example, comprise a processor 1090 (e.g., at least one) and a memory 1095 (e.g., at least one). Any or all of the functionality or associated modules discussed herein may, for example, be implemented in hardware and/or implemented using a combination of hardware and software (e.g., a processor operating in accordance with software instructions stored on a non-transitory computer-readable medium). For example, the processor 1090 may operate in accordance with software instructions stored in the memory 1095 to implement all or any part of the modules discussed herein. The processor 1090 may, for example, comprise one or more of a general-purpose microprocessor, a digital signal processor (DSP), an application specific integrated circuit (ASIC), a microcontroller, etc. The memory 1095 may, for example, comprise one or more of a non-volatile and/or volatile memory. Note that the memory 1095 may also be utilized for storing media content, media presentation characteristics, user profile information, etc.

Though the example media system component 900 and/or example media system device 1000 were shown as single units (e.g., in a single enclosure), the scope of this disclosure is not limited to such configurations. For example, the various example modules may be implemented in a distributed manner in a plurality of respective media system components and/or non-media system components. For example, the various example modules may be implemented in one or more security system (e.g., home security system) components, in one or more automation system (e.g., home automation system) components, in one or more media system (e.g., home media system) components, any combination thereof, etc.

In summary, various aspects of this disclosure provide a system and method for integrating a home media system and other home systems. While the foregoing has been described with reference to certain aspects and embodiments, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular embodiment(s) disclosed, but that the disclosure will include all embodiments falling within the scope of the appended claims.

What is claimed is:

1. A home network, the home network comprising:
   a media system, wherein:
   the media system is operable to present media in a plurality of locations, the media system is configured for communication via a resource, and the presentation of media is independent of the communication; and
   a monitor system, wherein:
   the monitor system is operably couple to the plurality of locations, and the monitor system is configured for communication via the resource.

2. The home network of claim 1, wherein the monitor system is operable to monitor security at the plurality of locations.

3. The home network of claim 1, wherein the monitor system comprises one or more security devices.

4. The home network of claim 1, wherein the monitor system is operable control lighting.

5. The home network of claim 1, wherein the monitor system is operable to control temperature at the plurality of locations.

6. The home network of claim 1, wherein the monitor system comprises one or more thermostats.

7. The home network of claim 1, wherein the resource comprises a sensor.

8. The home network of claim 1, wherein the resource comprises a media output device.

9. The home network of claim 1, wherein the resource is within a loudspeaker enclosure.

10. The home network of claim 1, wherein the resource is operable to provide an output to a user.

11. The home network of claim 1, wherein the resource is operable to obtain a user input.

12. The home network of claim 1, wherein the media system comprises one or more loudspeakers operable to output speech audio.

13. The home network of claim 1, wherein a device is operable to control the media system.

14. The home network of claim 1, wherein a device is operable to control the monitor system.

15. The home network of claim 1, wherein the media system is operable to communicate a condition of a sensor.

16. The home network of claim 15, wherein the sensor comprises one or more of: a temperature sensor, a gas sensor, a smoke sensor, and a motion detector.

17. The home network of claim 1, wherein the resource comprises a microphone.

18. The home network of claim 1, wherein the resource is operable to monitor one or more of temperature, gas, smoke, motion, humidity, and air quality at the plurality of locations.

19. The home network of claim 1, wherein the resource is operable to determine a user location.

20. The home network of claim 19, wherein the monitor system is operable to identify a media output device of the media system with which to provide a user output based at least in part on the user location.

* * * * *